(12) United States Patent
Nishikawa et al.

(10) Patent No.: US 12,344,125 B2
(45) Date of Patent: Jul. 1, 2025

(54) BATTERY COOLING SYSTEM, VEHICLE, AND NON-TRANSITORY RECORDING MEDIUM

(71) Applicant: SUBARU CORPORATION, Tokyo (JP)

(72) Inventors: Koichi Nishikawa, Tokyo (JP); Yuta Ikebe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/540,981

(22) Filed: Dec. 15, 2023

(65) Prior Publication Data

US 2024/0208367 A1 Jun. 27, 2024

(30) Foreign Application Priority Data

Dec. 23, 2022 (JP) ................................. 2022-206174

(51) Int. Cl.
| | |
|---|---|
| *B60L 58/26* | (2019.01) |
| *B60K 11/06* | (2006.01) |
| *G01K 3/00* | (2006.01) |
| *H01M 10/48* | (2006.01) |
| *H01M 10/613* | (2014.01) |

(Continued)

(52) U.S. Cl.
CPC .............. *B60L 58/26* (2019.02); *G01K 3/005* (2013.01); *H01M 10/486* (2013.01); *H01M 10/613* (2015.04); *H01M 10/625* (2015.04); *H01M 10/633* (2015.04); *H01M 10/6563* (2015.04); *B60K 11/06* (2013.01); *H01M 2220/20* (2013.01)

(58) Field of Classification Search
CPC ...... B60L 58/26; G01K 3/005; H01M 10/486; H01M 10/613; H01M 10/625; H01M 10/633; H01M 10/6563; H01M 2220/20; H01M 10/48; B60K 11/06; Y02E 60/10
See application file for complete search history.

(56) References Cited

U.S. PATENT DOCUMENTS

2019/0032404 A1* 1/2019 Chacon .................... E06B 9/72

FOREIGN PATENT DOCUMENTS

JP 2017-105287 A 6/2017
WO WO-2009150965 A1 * 12/2009 ......... B60H 1/00278

\* cited by examiner

*Primary Examiner* — Lindsay M Low
*Assistant Examiner* — Charles J Brauch
(74) *Attorney, Agent, or Firm* — TROUTMAN PEPPER LOCKE LLP

(57) ABSTRACT

A battery cooling system includes: one or more processors; and one or more memories communicably coupled to the one or more processors. The one or more processors: execute a temperature acquisition process of acquiring a temperature of a battery mounted on a vehicle; execute an output control process of making a comparison of the temperature of the battery acquired by the temperature acquisition process with a predetermined threshold, and controlling, in accordance with a result of the comparison, a cooling capacity of a cooling fan configured to cool the battery; execute an open or closed state recognition process of recognizing an open or closed state of a window openable and closable and provided in the vehicle; and, in executing the output control process, use different thresholds as the predetermined threshold, depending on the open or closed state recognized by the open or closed state recognition process.

11 Claims, 14 Drawing Sheets

(51) Int. Cl.
*H01M 10/625* (2014.01)
*H01M 10/633* (2014.01)
*H01M 10/6563* (2014.01)

BATTERY COOLING SYSTEM, VEHICLE, AND NON-TRANSITORY RECORDING MEDIUM

CROSS-REFERENCE TO RELATED APPLICATION

The present application claims priority from Japanese Patent Application No. 2022-206174 filed on Dec. 23, 2022, the entire contents of which are hereby incorporated by reference.

BACKGROUND

The disclosure relates to a battery cooling system, a vehicle, and a non-transitory recording medium.

In recent years, vehicles that use an electric motor as a drive source, such as electric vehicles or hybrid electric vehicles, have become common for, for example, environmental measures. A battery that supplies electricity to the electric motor is demanded to have high performance and achieve long lifetime.

On the other hand, various methods have been proposed to cool a battery, because an increase in temperature of a battery results in decreases in performance and lifetime of the battery.

For example, a recently known battery cooling system controls the number of rotations of a cooling fan in accordance with a factor such as opening and closing of a window of a vehicle, and reduces sensible noise due to startup of the cooling fan, without impairing cooling performance of the cooling fan. For example, reference is made to Japanese Unexamined Patent Application Publication (JP-A) No. 2017-105287.

SUMMARY

An aspect of the disclosure provides a battery cooling system to be applied to a vehicle. The battery cooling system includes one or more processors and one or more memories. The one or more memories are communicably coupled to the one or more processors. The one or more processors are configured to: execute a temperature acquisition process of acquiring a temperature of a battery mounted on the vehicle; execute an output control process of making a comparison of the temperature of the battery acquired by the temperature acquisition process with a predetermined threshold, and controlling, in accordance with a result of the comparison, a cooling capacity of a cooling fan configured to cool the battery; execute an open or closed state recognition process of recognizing an open or closed state of a window openable and closable and provided in the vehicle; and, in executing the output control process, use different thresholds as the predetermined threshold, depending on the open or closed state recognized by the open or closed state recognition process.

An aspect of the disclosure provides a vehicle including a battery cooling system configured to cool a battery of the vehicle. The battery cooling system includes one or more processors, one or more memories, a temperature sensor, and an open or closed state sensor. The one or more memories are communicably coupled to the one or more processors. The one or more processors are configured to: execute a temperature acquisition process of causing the temperature sensor to detect a temperature of the battery, and acquiring the detected temperature of the battery; execute an output control process of making a comparison of the temperature of the battery acquired by the temperature acquisition process with a predetermined threshold, and controlling, in accordance with a result of the comparison, a cooling capacity of a cooling fan configured to cool the battery; execute an open or closed state recognition process of causing the open or closed state sensor to recognize an open or closed state of a window openable and closable and provided in the vehicle; and, in executing the output control process, use different thresholds as the predetermined threshold, depending on the open or closed state recognized by the open or closed state recognition process.

An aspect of the disclosure provides a non-transitory computer readable recording medium containing a computer program. The computer program causes, when executed by a computer, the computer to implement a method. The method includes: acquiring a temperature of a battery mounted on a vehicle; executing an output control of making a comparison of the acquired temperature of the battery with a predetermined threshold, and controlling, in accordance with a result of the comparison, a cooling capacity of a cooling fan configured to cool the battery; recognizing an open or closed state of a window openable and closable and provided in the vehicle; and changing the predetermined threshold depending on the recognized open or closed state, in executing the output control.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
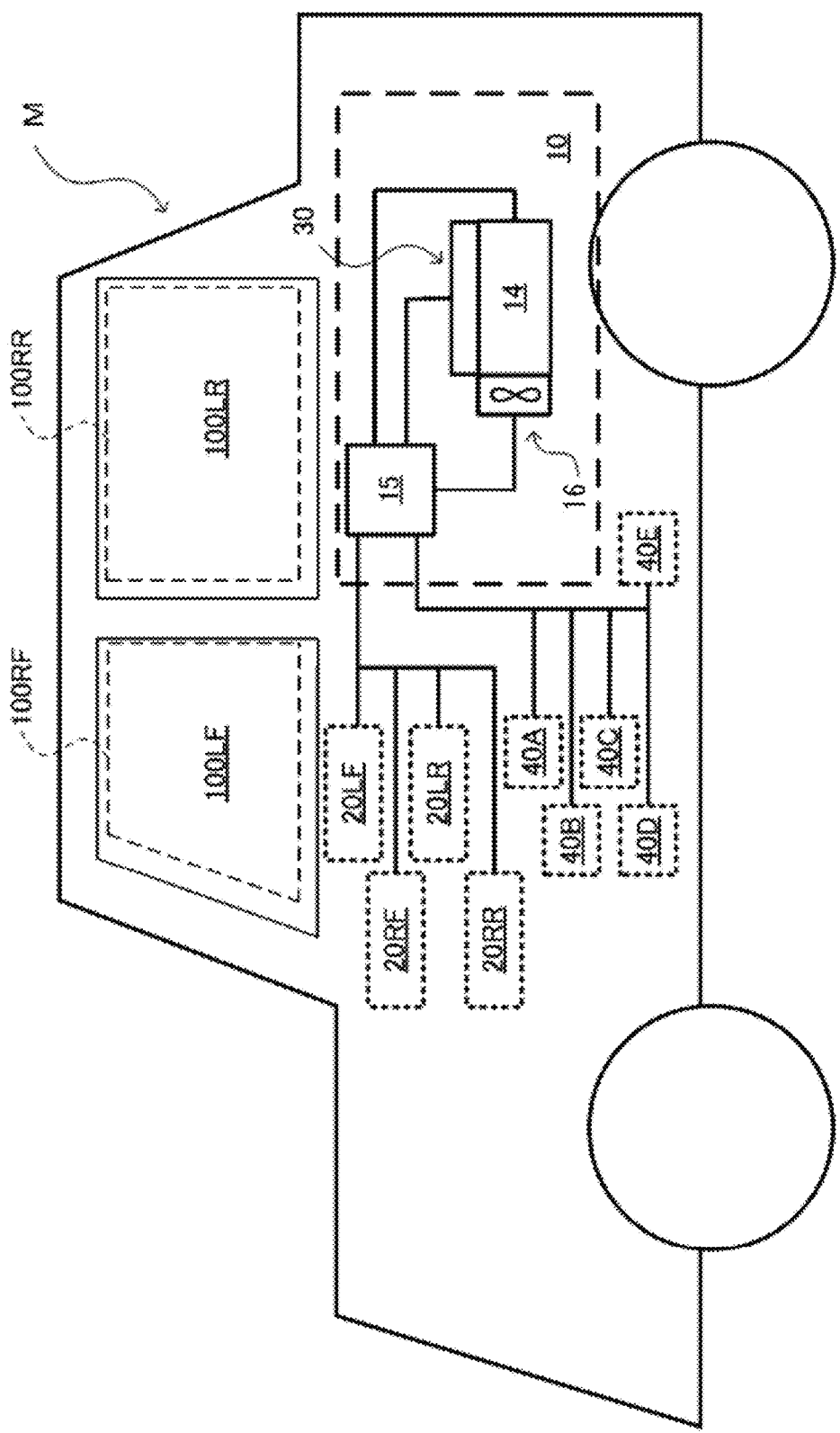
FIG. 1 is a system configuration diagram illustrating an example of a configuration of a cooling fan control system mounted on a vehicle according to one example embodiment of the disclosure.

A drive control method for a cooling fan disclosed in JP-A No. 2017-105287 merely changes the number of rotations of the cooling fan depending on an open state or a closed state of a window, and a further improvement is desired.

It is desirable to provide a cooling fan control system, a vehicle, and a non-transitory recording medium that make it possible to improve cooling performance of a cooling fan, without increasing an occupant's sense of discomfort about noise of the cooling fan.

A battery cooling system according to at least one embodiment of the disclosure is to be applied to a vehicle. The battery cooling system includes:
one or more processors; and
one or more memories communicably coupled to the one or more processors.
The one or more processors are configured to:
execute a temperature acquisition process of acquiring a temperature of a battery mounted on the vehicle;
execute an output control process of making a comparison of the temperature of the battery acquired by the temperature acquisition process with a predetermined threshold, and controlling, in accordance with a result of the comparison, a cooling capacity of a cooling fan configured to cool the battery;
execute an open or closed state recognition process of recognizing an open or closed state of a window openable and closable and provided in the vehicle; and,
in executing the output control process, use different thresholds as the predetermined threshold, depending on the open or closed state recognized by the open or closed state recognition process.

Note that embodiments of the disclosure may be implemented also by a vehicle that executes the processes described above, or a non-transitory recording medium containing a computer program for execution of the processes described above.

With this configuration, when the window is in an open state, even if the cooling capacity of the cooling fan is enhanced and noise thereof increases, at least one embodiment of the disclosure makes it possible to relatively reduce an influence of the noise of the cooling fan on an occupant, because background noise inside the vehicle, such as road noise, also increases.

Consequently, at least one embodiment of the disclosure makes it possible to improve the cooling capacity of the cooling fan, without increasing the occupant's sense of discomfort about the noise of the cooling fan.

The "output control process" may refer to, for example, controlling the number of rotations of the cooling fan. For example, in some embodiments, the number of rotations of the cooling fan may be controlled stepwise as the "output control process".

As the "threshold", one or more values may basically be defined to switch the cooling capacity. In some embodiments, multiple values may be defined.

The cooling capacity of the cooling fan may refer to, for example, a capability of the cooling fan to supply an air volume of cooling air, such as the number of rotations or a duty ratio (a ratio of energization time per unit time cycle).

Controlling the cooling capacity of the cooling fan may refer to, for example, changing, in accordance with the threshold, the capability of the cooling fan to supply the air volume of the cooling air, such as the number of rotations or the duty ratio, i.e., a temporal use state.

Using different thresholds depending on the open or closed state may refer to using different thresholds between the open state and a closed state of the window. For example, this wording may refer to using, in the window open state, a second threshold that makes an output of the cooling fan higher, under the same condition, than a first threshold to be used when the window of the vehicle is in the closed state. The same condition may be, for example, the same temperature of the battery.

In some embodiments, in executing the output control process, the one or more processors may be configured to, when the one or more processors recognize that the window is in an open state by the open or closed state recognition process, use a second threshold that makes the cooling capacity of the cooling fan higher, at the same temperature of the battery, than a first threshold to be used when the window is in a closed state.

With this configuration, some embodiments of the disclosure make it possible to increase the output of the cooling fan when the window is in the open state. Thus, when the window is in the open state, it is possible to improve cooling performance of the cooling fan, without increasing the occupant's sense of discomfort about the noise of the cooling fan.

In some embodiments, the one or more processors may be configured to:
execute a seating position detection process of detecting a seating position of an occupant on board the vehicle;
execute an identification process of identifying a position of the window in an open state; and,
in executing the output control process, use different thresholds as the predetermined threshold, depending on the open or closed state of the window recognized by the open or closed state recognition process, and depending on the detected seating position of the occupant and the identified position of the window in the open state.

With this configuration, some embodiments of the disclosure make it possible to control the cooling capacity of the cooling fan in consideration of also the seating position and the position of the window in the window open state.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 2:
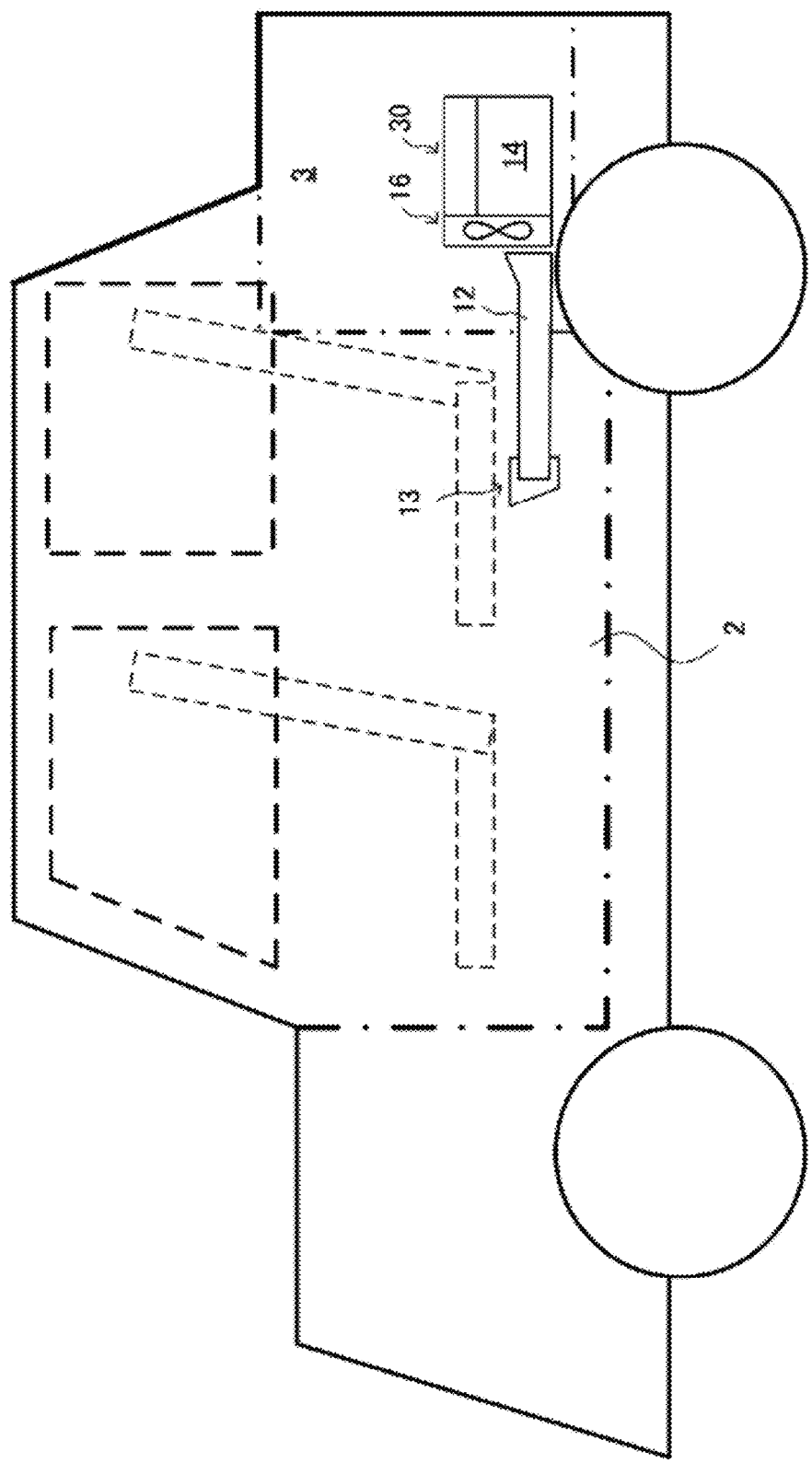
FIG. 2 is a schematic configuration diagram illustrating the vehicle, illustrating a relationship between a vehicle compartment and a luggage compartment including a high-voltage battery and a duct mounted on the vehicle according to one example embodiment of the disclosure.

First, description is given of a configuration of a vehicle M including a cooling fan control system 10 according to an example embodiment, with reference to FIGS. 1 and 2.

FIG. 1 is a system configuration diagram illustrating an example of a configuration of the cooling fan control system 10 mounted on the vehicle M according to the example embodiment.

FIG. 2 is a schematic configuration diagram illustrating the vehicle M, illustrating a relationship between a vehicle compartment 2 and a luggage compartment 3 including a high-voltage battery 14 and a duct 12 mounted on the vehicle M according to the example embodiment.

The vehicle M illustrated as an example in FIG. 1 may be a vehicle that uses a large amount of electricity, such as an electric vehicle including an electric motor, or a hybrid electric vehicle including an electric motor and another power source such as an engine. The vehicle M may be a vehicle drivable by a driver, such as a four-wheeled vehicle or a motorcycle. The driver may be a person who drives the vehicle.

The vehicle M may be configured to, for example, drive an unillustrated electric motor to obtain power thereof, and travel on a roadway in accordance with the driver's operation or under automated control.

In addition, the vehicle M may include the high-voltage battery 14 configured to drive the unillustrated electric motor. The vehicle M may include the cooling fan control system 10 that performs a control to cool the high-voltage battery 14, based on an open or closed state of a window 100 and a temperature of the high-voltage battery 14.

For example, the vehicle M may include the vehicle compartment 2 and the luggage compartment 3 as illustrated in FIG. 2. The vehicle compartment 2 may accommodate an occupant including the driver who is seated, and have the window 100 opened and closed. The luggage compartment 3 may be provided, for example, behind the vehicle compartment 2 of the vehicle M in a normal traveling direction.

The vehicle M according to the example embodiment may include, in the vehicle compartment 2, a right front window 100RF, a right rear window 100RR, a left front window 100LF, and a left rear window 100LR, with respect to the traveling direction. The right front window 100RF, the right rear window 100RR, the left front window 100LF, and the left rear window 100LR may hereinafter be collectively referred to as "the window 100".

The vehicle M according to the example embodiment may further include a window opening and closing drive unit 20RF, a window opening and closing drive unit 20RR, a window opening and closing drive unit 20LF, and a window opening and closing drive unit 20LR that each control opening and closing of the corresponding window 100, based on the occupant's instruction to the window 100.

In other words, each window opening and closing drive unit 20 may be provided for the corresponding window 100, and configured to control opening and closing of the corresponding window 100 independently, based on the occupant's instruction inputted by an operation via an unillustrated switch.

Note that, in the example embodiment, including the above description, the window opening and closing drive unit 20RF, the window opening and closing drive unit 20RR, the window opening and closing drive unit 20LF, and the window opening and closing drive unit 20LR may be collectively referred to as a window opening and closing drive unit 20, unless otherwise specified.

The window opening and closing drive unit 20RF, the window opening and closing drive unit 20RR, the window opening and closing drive unit 20LF, and the window opening and closing drive unit 20LR may each basically be included in an unillustrated door provided with the corresponding window 100. However, FIG. 1 illustrates, for simplification, a state in which each window opening and closing drive unit 20 is disposed in the vehicle M, and does not express that each window opening and closing drive unit 20 is included in the door.

In addition, the window opening and closing drive unit 20 may detect the open or closed state of each window 100, and provide a result of the detection to the cooling fan control system 10.

In one example, the window opening and closing drive unit 20 may include, for example, an unillustrated sensor configured to detect a position of the window 100, such as a pulse sensor, and detect the position of the corresponding window 100 based on an output of the sensor.

Based on the position of the window 100, the window opening and closing drive unit 20 may detect the open or closed state of the corresponding window 100, and output the detected state to the cooling fan control system 10 (e.g., a control unit 15 to be described later). In one embodiment, the window opening and closing drive unit 20 may serve as an "open or closed state sensor".

Note that the window opening and closing drive unit 20 may estimate the position of each window 100, based on a movement direction and a movement speed of the window 100.

In addition to the above configuration, the vehicle M according to the example embodiment may include seating sensors 40A, 40B, 40C, 40D, and 40E that each detect whether the occupant is seated. The seating sensors 40A, 40B, 40C, 40D, and 40E may be provided respectively in unillustrated seats, i.e., a driver's seat, a passenger seat, and rear seats provided in the vehicle compartment 2. The seating sensors 40A, 40B, 40C, 40D, and 40E may hereinafter be collectively referred to as a seating sensor 40.

For example, each seating sensor 40 may include a pressure sensor or an infrared sensor. When the occupant is seated on the corresponding seat, each seating sensor 40 may output data indicating that the occupant is seated to the cooling fan control system 10 (e.g., the control unit 15 to be described later).

Figure 3:
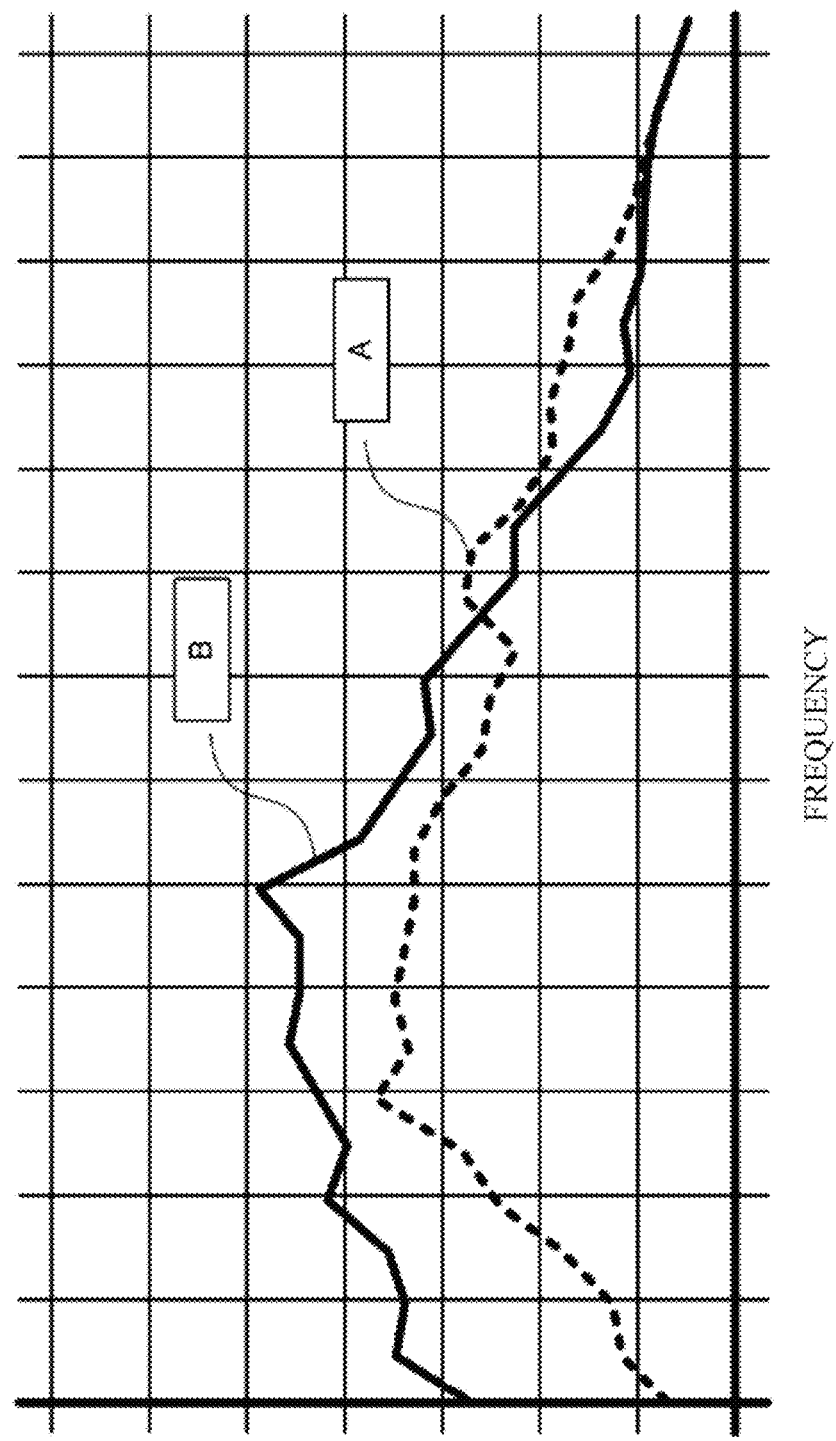
FIG. 3 is a diagram illustrating features of the cooling fan control system according to one example embodiment of the disclosure, including graphs comparing background noise caused while a specific vehicle is traveling and noise of a cooling fan caused while the specific vehicle is stopped.

Next, description is given of the cooling fan control system 10 mounted on the vehicle M according to the example embodiment, with reference to FIG. 3 as well as FIGS. 1 and 2 described above.

FIG. 3 is a diagram illustrating features of the cooling fan control system 10 according to the example embodiment, including graphs comparing background noise caused while a specific vehicle is traveling and noise of a cooling fan 16 caused while the specific vehicle is stopped.

The cooling fan control system 10 according to the example embodiment may be a system configured to cool the high-voltage battery 14, when a battery temperature of the high-voltage battery 14 mounted on the vehicle M increases to a certain temperature or greater. In one embodiment, the cooling fan control system 10 may serve as a "battery cooling system". In one embodiment, the high-voltage battery 14 may serve as a "battery".

In general, as described above, an increase in the battery temperature of the high-voltage battery 14 (i.e., the temperature of the battery) results in decreases in performance and lifetime of the high-voltage battery 14. Accordingly, a cooling capacity is to be enhanced to keep high performance and achieve long lifetime.

On the other hand, the number of rotations of the cooling fan 16 may be increased as a method to enhance the cooling capacity of the cooling fan 16, but an increase in the number of rotations causes the noise to increase proportionally.

For example, as illustrated in FIG. 2, the duct 12 coupling the inside of the vehicle compartment 2 and the cooling fan 16 may be generally provided, to guide air-conditioning air in the vehicle compartment 2 suitable for cooling to the cooling fan 16.

Thus, an increase in the number of rotations of the cooling fan 16 causes noise due to the cooling fan 16 to increase proportionally, and the noise is transmitted to the inside of the vehicle compartment 2 via the duct 12, which results in an increase in the occupant's sense of discomfort.

On the other hand, when the window 100 provided in the vehicle M is in an open state, the background noise such as road noise or wind noise increases in the vehicle compartment 2 of the vehicle M, which makes it possible to relatively reduce an influence of the noise of the cooling fan 16 recognized by the occupant.

For example, as illustrated as an example in FIG. 3, a level, in the vehicle compartment 2, of the background noise in each band caused while the specific vehicle is traveling in a specific traveling state is substantially the same level as when the cooling fan 16 operates in a predetermined operation state while the specific vehicle is stopped.

Note that FIG. 3 includes a graph A indicating the level, in the vehicle compartment 2, of the background noise caused when the specific vehicle is traveling in the specific traveling state, and a graph B indicating the level, in the vehicle compartment 2, of the noise caused by the cooling fan 16 in the predetermined operation state while the specific vehicle is stopped.

Thus, when the vehicle M is traveling and the window 100 is in the open state, even if the cooling fan 16 is driven, the noise due to the cooling fan 16 is less likely to increase the occupant's sense of discomfort.

In other words, if the background noise such as road noise or wind noise during traveling reaches the occupant's ears, the noise of the cooling fan 16 is masked even if the noise of the cooling fan 16 increases. Thus, the noise due to the cooling fan 16 is less likely to increase the occupant's sense of discomfort.

Hence, the cooling fan control system 10 according to the example embodiment is configured to change a threshold to be used in determining the cooling capacity of the cooling fan 16 based on the battery temperature, between the open state and the closed state of the window 100.

In one example, the cooling fan control system 10 may include the cooling fan 16. The cooling fan control system 10 may be configured to execute a cooling fan control process of detecting the open or closed state of the window 100 and the battery temperature, and controlling cooling of the high-voltage battery 14, based on the battery temperature and the detected open or closed state of the window 100.

To execute the cooling fan control process described above, the cooling fan control system 10 according to the example embodiment may include the control unit 15 and a temperature sensor 30, in addition to the high-voltage battery 14 and the cooling fan 16, as illustrated in FIG. 1. The control unit 15 may be configured to control each part of the vehicle M.

For example, the cooling fan control system 10 is configured to execute a temperature acquisition process of acquiring the temperature of the high-voltage battery 14. The temperature of the high-voltage battery 14 may be detected by the temperature sensor 30.

The cooling fan control system 10 is configured to execute an output control process of comparing the battery temperature detected by the temperature acquisition process with a predetermined threshold, and controlling an output of the cooling fan 16 stepwise in accordance with a result of the comparison.

The cooling fan control system 10 is configured to execute an open or closed state recognition process, or a window open or closed state recognition process, of recognizing the open or closed state of the window 100 openable and closable and provided in the vehicle M, and use different thresholds depending on the open or closed state recognized by the open or closed state recognition process.

With such a configuration, the background noise such as road noise increases inside the vehicle when the window 100 of the vehicle M is in the open state, and the cooling fan control system 10 thus makes it possible to enhance the cooling capacity (e.g., the number of rotations or a duty ratio) of the cooling fan 16, in accordance with the level of the background noise.

Thus, the cooling fan control system 10 makes it possible to improve the cooling capacity of the cooling fan 16, without increasing the occupant's sense of discomfort about the noise of the cooling fan 16.

The high-voltage battery 14 may be, for example, a secondary battery such as a lithium-ion battery or a nickel-metal hydride battery. The high-voltage battery 14 may be, for example, contained in the luggage compartment 3 of the vehicle M. Note that the high-voltage battery 14 may be contained in a predetermined place of the vehicle M, such as an underfloor space.

The high-voltage battery 14 may be coupled to, for example, an unillustrated in-vehicle battery charger, and chargeable by various methods.

The high-voltage battery 14 may be coupled to the unillustrated electric motor via an unillustrated inverter. The high-voltage battery 14 may accumulate electric power to be used to drive the electric motor, convert direct-current electric power into alternating-current electric power via the unillustrated inverter, and supply the converted electric power to the electric motor.

The control unit 15 may include one or more processors and one or more memories communicably coupled to the one or more processors. Examples of the one or more processors may include a central processing unit (CPU) and a micro processing unit (MPU).

Operations of the control unit 15 may be implemented by hardware such as various processors, or an application program. Examples of the various processors may include a CPU and a digital signal processor (DSP).

All or a part of the control unit 15 may be updatable by firmware, for example. All or a part of the control unit 15 may be, for example, a program module to be executed by a command from a device such as a CPU.

The control unit 15 according to the example embodiment may be configured to control the number of rotations of the cooling fan 16 stepwise, in conjunction with the temperature sensor 30 and the window opening and closing drive unit 20.

In one example, the control unit 15 may acquire the battery temperature detected by the temperature sensor 30, and detect the open or closed state of the window 100 driven by the window opening and closing drive unit 20.

Based on the acquired battery temperature and the detected the open or closed state of the window 100, the control unit 15 may switch between multiple modes in each of which an air volume to be outputted from the cooling fan 16 is defined in advance, and control, stepwise, the air volume to be supplied to the high-voltage battery 14.

For example, even at the same battery temperature, when the window 100 is in the open state, the control unit 15 may be configured to execute a control that makes an air volume of cooling air larger than in the window closed state. The air volume of the cooling air may correspond to the number of rotations or the duty ratio.

For example, the control unit 15 may control the air volume of the cooling fan 16 stepwise, based on six levels of modes from a mode "0" of stopping driving of the cooling fan 16 to a mode "5" with a maximum air volume.

The cooling fan 16 may be provided for the high-voltage battery 14 to cool the high-voltage battery 14. As illustrated in FIG. 2, the cooling fan 16 may be configured to guide the air-conditioning air in the vehicle compartment 2, via the duct 12, to the high-voltage battery 14 from an intake port 13 provided in the vehicle compartment 2.

The temperature sensor 30 may be provided in the luggage compartment 3 together with the high-voltage battery 14. The temperature sensor 30 may detect the temperature of the high-voltage battery 14, and output a result of the detection to the control unit 15.

Next, description is given of the temperature acquisition process to be executed by the control unit 15 according to the example embodiment.

The control unit 15 may execute the temperature acquisition process of acquiring the battery temperature detected by the temperature sensor 30, at a timing of starting cooling of the high-voltage battery 14, such as upon start of operation of the electric motor or upon startup of the engine. The timing of starting cooling of the high-voltage battery 14 may hereinafter be referred to as a "cooling start timing".

For example, in addition to or instead of the above timing, the cooling start timing may be upon start of operation of the electric motor or upon startup of the engine after exposure for a certain time in a low-temperature environment such as an outside air temperature below zero or under hot sun (e.g., exposure for 1 hour or more at an outside air temperature of 30° C. or greater).

Next, description is given of the window open or closed state recognition process to be executed by the control unit 15 according to the example embodiment.

During execution of the cooling fan control process, the control unit 15 may receive a signal or data indicating the open state or the closed state of each window 100 detected by the corresponding window opening and closing drive unit 20.

The control unit 15 may thus execute the window open or closed state recognition process of recognizing whether the window 100 is in the open state or in the closed state as a whole, while individually recognizing that each window 100 is in the open state or the closed state.

In one example, each window opening and closing drive unit 20 may, as described above, detect the open state or the closed state of the window 100 based on the position of the corresponding window 100 identified by using a sensor or by calculation, and output data indicating a result of the detection to the control unit 15.

At this time, when the control unit 15 receives data or a signal indicating the window open state or the window closed state outputted from the window opening and closing drive unit 20, the control unit 15 may recognize the open state or the closed state of each window 100 associated with the corresponding window opening and closing drive unit 20.

When at least one of the windows 100 is in the open state, the control unit 15 may recognize that the window 100 is in the open state as a whole. When all the windows 100 are in the closed state, the control unit 15 may recognize that the window 100 is in the closed state as a whole.

Upon receiving data indicating the window open state or the window closed state outputted from the window opening and closing drive unit 20, the control unit 15 may keep the recognition of the open or closed state of the corresponding window 100, until the control unit 15 receives data or a signal indicating a new state.

Figure 4:
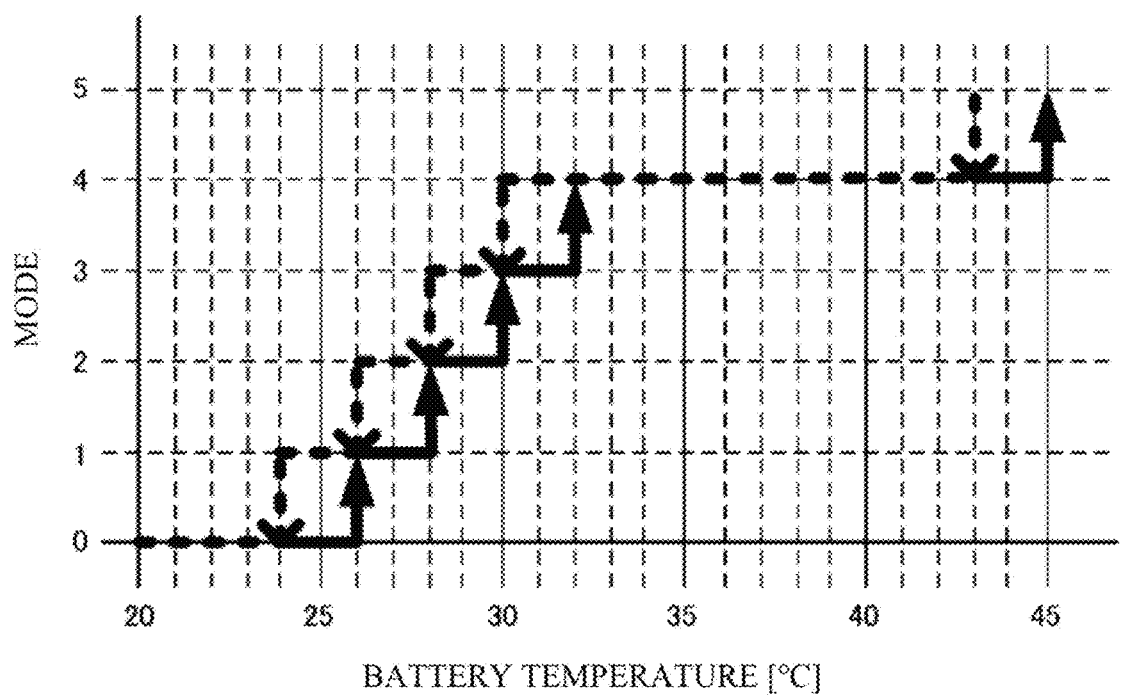
FIG. 4 is a diagram or a map illustrating a relationship between a low-output temperature threshold (group) during an increase and a decrease in temperature, and each mode in which a cooling capacity of the cooling fan corresponding to a battery temperature is defined, when a window is in a closed state in one example embodiment of the disclosure.
Figure 5:
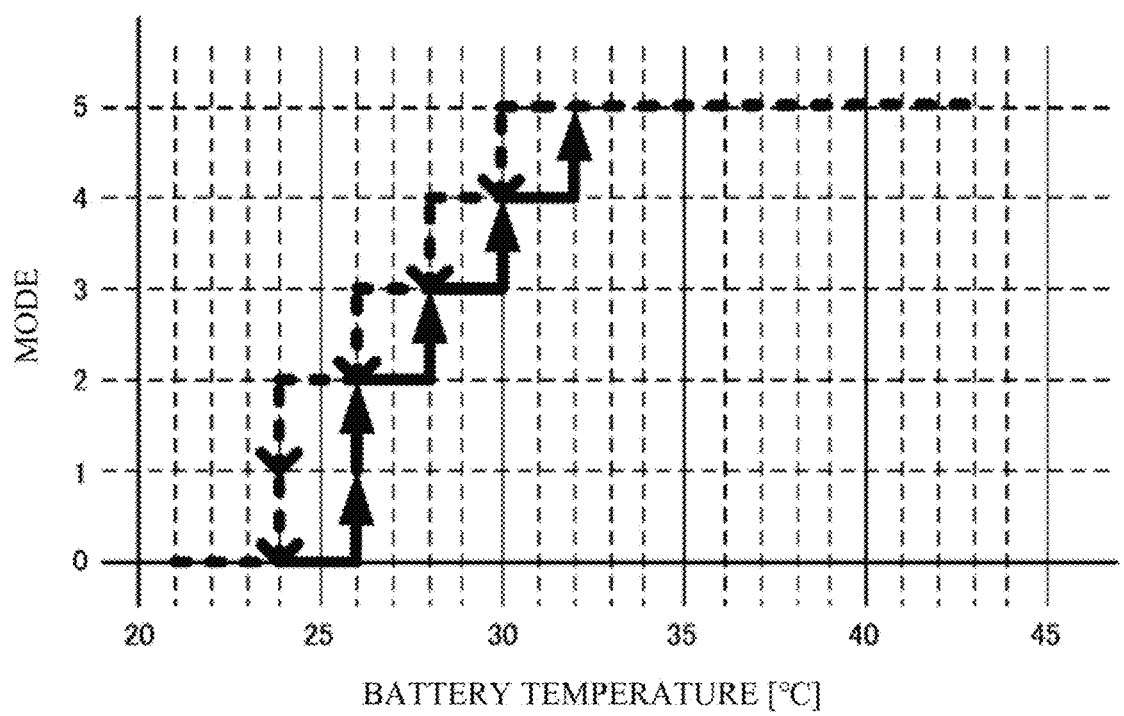
FIG. 5 is a diagram or a map illustrating a relationship between a high-output temperature threshold (group) during an increase and a decrease in temperature, and each mode in which the cooling capacity of the cooling fan corresponding to the battery temperature is defined, when the window is in an open state in one example embodiment of the disclosure.

Next, description is given of the output control process to be executed by the control unit 15 according to the example embodiment, with reference to FIGS. 4 and 5.

FIGS. 4 and 5 are each a diagram or a map illustrating a relationship between a temperature threshold (group) during an increase and a decrease in temperature, and each mode in which the cooling capacity of the cooling fan 16 corresponding to the battery temperature is defined, when the window 100 is in the open state or the closed state in the example embodiment.

The control unit 15 may execute the output control process of comparing the acquired battery temperature with the predetermined threshold, and determining, in accordance with a result of the comparison, the cooling capacity of the cooling fan 16 configured to cool the high-voltage battery 14, to thereby control the output of the cooling fan 16.

For example, to switch the cooling capacity of the cooling fan 16 stepwise, the control unit 15 may control the cooling fan 16 by using thresholds different between when the battery temperature increases and when the battery temperature decreases. The thresholds may be multiple thresholds defined as different temperatures in advance and may each hereinafter be referred to as a "temperature threshold".

When the control unit 15 determines that the battery temperature is greater than or equal to a temperature threshold during an increase or less than or equal to a temperature threshold during a decrease, the control unit 15 may set the cooling capacity to a cooling capacity (e.g., a mode in which the duty ratio is set) preset in association with the corresponding temperature threshold.

On the other hand, in switching the cooling capacity of the cooling fan 16 stepwise, the control unit 15 may use different temperature thresholds to control the output of the cooling fan 16, depending on the open or closed state of the window 100 recognized in the above manner. The temperature threshold may be, for example, a temperature threshold (group) including multiple thresholds.

For example, the control unit 15 may use a temperature threshold (group) that balances the noise caused by the cooling fan 16 and the cooling capacity, and, when the window 100 is in the open state, use a temperature threshold (group) that enhances the cooling capacity within a range that prevents the noise recognized by the occupant from giving a sense of discomfort.

In other words, the control unit 15 may execute the output control process of controlling the output of the cooling fan 16, by using a low-output temperature threshold (group) when the window 100 is in the window closed state, and using a high-output temperature threshold (group) when the window 100 is in the open state. In one embodiment, the low-output temperature threshold (group) may serve as a "first threshold". In one embodiment, the high-output temperature threshold (group) may serve as a "second threshold".

In one example, the control unit 15 may execute, as the output control process, a cooling fan startup control process of controlling startup of the cooling fan 16.

The control unit 15 may also execute, as the output control process, a cooling fan drive control process using each temperature threshold (group), while switching between the high-output temperature threshold (group) and the low-output temperature threshold (group) depending on the open or closed state of the window 100.

As the cooling fan startup control process, the control unit 15 may control startup of the cooling fan 16, based on an instruction for start of the output control process, such as turning-on of the electric motor or startup of the engine.

The control unit 15 may, as the cooling fan startup control process, issue an instruction for start of the cooling fan drive control process in the open state or the closed state of the window 100, in conjunction with the window open or closed state recognition process of detecting the open or closed state of the window 100.

For example, upon recognizing that the window 100 is in the window closed state as the window open or closed state recognition process, the control unit 15 may set the low-output temperature threshold (group), as the temperature threshold (group) to be used in executing the cooling fan drive control process. The temperature threshold (group) to be used in executing the cooling fan drive control process may hereinafter be referred to as an "execution threshold".

In one example, each temperature threshold (group) may include multiple thresholds during an increase that are to be used while the battery temperature is increasing and are increased in value stepwise, and multiple thresholds during a decrease that are to be used while the battery temperature is decreasing and are reduced in value stepwise.

Upon recognizing that the window 100 is in the window open state as the window open or closed state recognition process, the control unit 15 may set the high-output temperature threshold (group), instead of the low-output temperature threshold (group) in the window closed state, as the execution threshold to be used in executing the cooling fan drive control process.

On the other hand, during execution of the output control process, when the window open or closed state changes to another state, the control unit 15 may execute a switching process of switching the execution threshold, from the high-output temperature threshold (group) to the low-output temperature threshold (group), or from the low-output temperature threshold (group) to the high-output temperature threshold (group).

Note that the control unit 15 may execute an intake air temperature checking process of checking an intake air temperature of the high-voltage battery 14, to accurately recognize the battery temperature of the high-voltage battery 14, as an initial setting.

Based on the low-output temperature threshold (group) to be used while the battery temperature is increasing or decreasing, preset by the cooling fan startup control process as described above, the control unit 15 may set the cooling capacity of the cooling fan 16, and control driving of the cooling fan 16 based on the set cooling capacity.

In one example, when the low-output temperature threshold (group) is set as the execution threshold, temperature ranges of the battery temperature may be defined in association with the thresholds, and multiple modes in each of which the cooling capacity of the cooling fan 16 is defined may be assigned to the respective temperature ranges in advance.

When the battery temperature increases, as illustrated as an example in FIG. 4, the control unit 15 may identify the temperature range to which the battery temperature belongs, and control driving of the cooling fan 16 based on the mode assigned to the identified temperature range.

For example, the control unit 15 may classify the cooling capacity of the cooling fan 16 into multiple modes and perform a drive control of the cooling fan 16 by, for example, changing the number of rotations, drive time, or a value of the duty ratio.

Note that FIG. 4 indicates that, while the battery temperature is increasing, the cooling fan 16 may stop in the minimum mode (a mode 0) when the battery temperature is less than 26° C. (the temperature threshold).

FIG. 4 also indicates that modes (modes 1 to 5) in which the cooling fan 16 is driven may be set when the battery temperature is greater than or equal to 26° C.

For example, FIG. 4 indicates that the mode 1 may be set when the battery temperature becomes greater than or equal to 26° C., the mode may rise by one level each time the battery temperature increases by 2° C., and the mode 4 may be set when the battery temperature is greater than or equal to 32° C.

FIG. 4 indicates that the maximum mode 5 may be set when the battery temperature is greater than or equal to 45° C.

Also when the low-output temperature threshold (group) to be used when the battery temperature decreases is set, a control basically similar to the drive control of the cooling fan 16 executed when the battery temperature increases may be executed, except for a difference in thresholds.

In other words, when the low-output temperature threshold (group) is set as the execution threshold, temperature ranges of the battery temperature may be defined in association with the thresholds to be used during a decrease, and multiple modes in each of which the cooling capacity of the cooling fan 16 is defined may be assigned to the respective temperature ranges in advance.

When the battery temperature decreases, as illustrated as an example in FIG. 4, the control unit 15 may identify the temperature range to which the battery temperature belongs, and control driving of the cooling fan 16 based on the mode assigned to the identified temperature range.

Note that FIG. 4 indicates that, while the battery temperature is decreasing, the mode of the cooling fan 16 may gradually lower when the battery temperature greater than or equal to 45° C. becomes less than 43° C. and further decreases.

For example, FIG. 4 indicates that the mode 4 may be set when the battery temperature becomes less than 43° C., the mode 3 may be set when the battery temperature becomes less than 30° C., the mode may lower by one level each time the battery temperature decreases by 2° C., and the mode 0 may be set and the cooling fan 16 may stop when the battery temperature becomes less than 24° C.

In the cooling fan drive control process in the open state of the window 100, the control unit 15 may use the high-output temperature threshold (group) to execute the cooling fan drive control process, instead of using the low-output temperature threshold (group). Note that other processes and operations may be similar to those in the cooling fan drive control process in the window closed state, and detailed description thereof is thus omitted.

As in the closed state of the window 100, the control unit 15 may classify the cooling capacity of the cooling fan 16 into multiple modes and perform a drive control of the cooling fan 16 by, for example, changing the number of rotations, drive time, or a value of the duty ratio.

For example, as illustrated in FIG. 5, the control unit 15 may use 26° C., 28° C., 30° C., and 32° C., as the thresholds to be used when the battery temperature increases, in the high-output temperature threshold (group).

As illustrated in FIG. 5, the control unit 15 may set the mode 0 (stopping driving) for the temperature range of temperatures less than 26° C., set the mode 2 for the temperature range from 26° C. to 28° C., and set the mode 3 for the temperature range from 28° C. to 30° C.

As illustrated in FIG. 5, the control unit 15 may set the mode 4 for the temperature range from 30° C. to 32° C., and set the mode 5 for the temperature range of greater than or equal to 32° C.

For example, as illustrated in FIG. 5, the control unit 15 may use 24° C., 26° C., 28° C., and 30° C., as the thresholds to be used when the battery temperature decreases, in the high-output temperature threshold (group).

As illustrated in FIG. 5, while the battery temperature is decreasing, the control unit 15 may set the mode 4 for the temperature range from 30° C. to 28° C., and set the mode 3 for the temperature range from 28° C. to 26° C.

The control unit 15 may set the mode 2 for the temperature range from 26° C. to 24° C., and set the mode 0 for the temperature range of less than or equal to 24° C.

Figure 6:
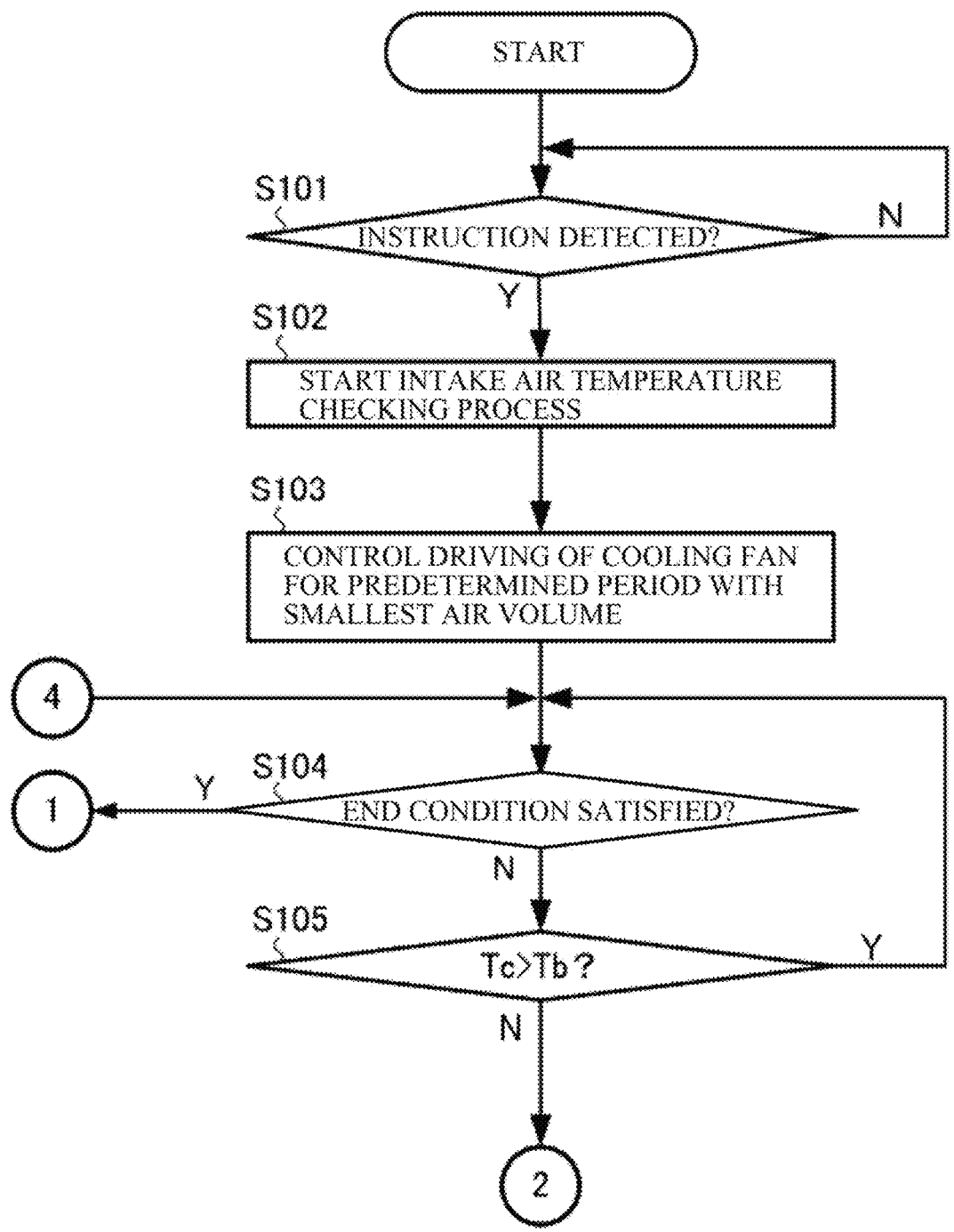
FIG. 6 is a flowchart illustrating operation of a cooling fan startup control process to be executed in the cooling fan control system according to one example embodiment of the disclosure.
Figure 7:
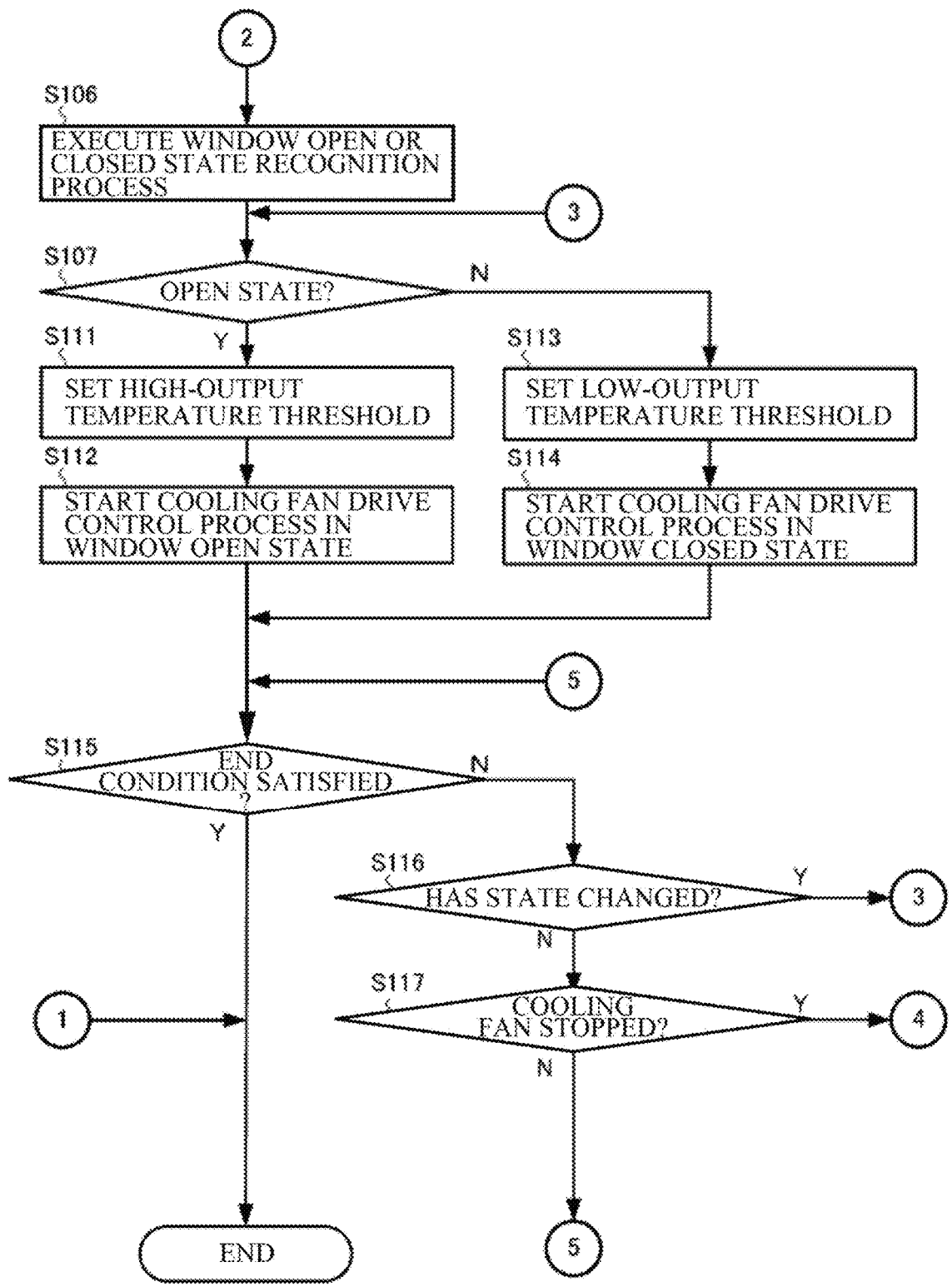
FIG. 7 is a flowchart illustrating the operation of the cooling fan startup control process to be executed in the cooling fan control system according to one example embodiment of the disclosure.

Next, description is given of operation of the cooling fan startup control process in the cooling fan control system 10 according to the example embodiment, with reference to FIGS. 6 and 7.

FIGS. 6 and 7 are flowcharts illustrating the operation of the cooling fan startup control process in the cooling fan control system 10 according to the example embodiment.

The operation may basically be operation to be started upon turning-on of the electric motor or startup of the engine in the vehicle M.

It is assumed that the window open or closed state recognition process is executed every predetermined timing, from turning-on of the electric motor or startup of the engine until the electric motor or the engine is turned off.

First, the control unit 15 may determine whether an instruction for start of the operation such as turning-on of the electric motor or startup of the engine has been detected (step S101). If the control unit 15 determines that no instruction for start of the operation has been detected (step S101: N), the control unit 15 may repeat step S101. If the control unit 15 determines that an instruction for start of the operation such as turning-on of the electric motor or startup of the engine has been detected (step S101: Y), the control unit 15 may start the intake air temperature checking process of checking an intake air temperature Tc of the high-voltage battery 14 (step S102).

Thereafter, the control unit 15 may control driving of the cooling fan 16 for a predetermined period with the smallest air volume, i.e., in the mode 1 (step S103). The predetermined period may be time enough for a temperature near the temperature sensor 30 to converge to the intake air temperature.

Thereafter, the control unit 15 may determine whether an end condition such as stop of the electric motor or the engine is satisfied (step S104).

At this time, if the control unit 15 determines that the end condition is satisfied (step S104: Y), the control unit 15 may end the operation. If the control unit 15 determines that the end condition is not satisfied (step S104: N), the control unit 15 may cause the process to proceed to step S105.

Thereafter, the control unit 15 may determine whether the temperature (i.e., battery temperature) Tb of the high-voltage battery 14 detected by the temperature sensor 30 is less than the intake air temperature Tc (step S105).

At this time, if the control unit 15 determines that the battery temperature Tb is less than the intake air temperature Tc (step S105: Y), the control unit 15 may cause the process to return to step S104.

If the control unit 15 determines that the battery temperature Tb is not less than the intake air temperature Tc, i.e., the battery temperature Tb is the same as or higher than the intake air temperature Tc (step S105: N), the control unit 15 may end the intake air temperature checking process and cause the process to proceed to step S106.

Thereafter, the control unit 15 may execute the window open or closed state recognition process of recognizing the open or closed state of the window 100 (step S106).

Thereafter, the control unit 15 may determine whether the open or closed state of the window 100 is the window open state (step S107).

At this time, if the control unit 15 determines that the open or closed state of the window 100 is the window open state (step S107: Y), the control unit 15 may cause the process to proceed to step S111. If the control unit 15 determines that the open or closed state of the window 100 is not the window open state, i.e., is the window closed state (step S107: N), the control unit 15 may cause the process to proceed to step S113.

Thereafter, upon determining that the open or closed state of the window 100 is the window open state, the control unit 15 may set the execution threshold for switching of an output mode of the cooling fan 16 to the high-output temperature threshold (step S111).

The control unit 15 may start the cooling fan drive control process in the window open state (step S112), and cause the process to proceed to step S115.

Upon determining that the open or closed state of the window 100 is not the window open state, the control unit 15 may set the execution threshold for switching of the output mode of the cooling fan 16 to the low-output temperature threshold (step S113).

The control unit 15 may start the cooling fan drive control process in the window closed state (step S114), and cause the process to proceed to step S115.

Thereafter, the control unit 15 may determine again whether the end condition is satisfied (step S115), and also determine whether the open or closed state of the window 100 has changed to another state and whether driving of the cooling fan 16 is stopped (steps S116 and S117).

In one example, if the control unit 15 determines that the end condition is satisfied (step S115: Y), the control unit 15 may end the operation. If the control unit 15 determines that the end condition is not satisfied (step S115: N), the control unit 15 may determine whether the open or closed state of the window 100 has changed to another state.

If the control unit 15 determines that the open or closed state of the window 100 has changed to another state (step S116: Y), the control unit 15 may cause the process to proceed to step S107. If the control unit 15 determines that the open or closed state of the window 100 has not changed to another state (step S116: N), the control unit 15 may determine whether driving of the cooling fan 16 is stopped.

Thereafter, if the control unit 15 determines that driving of the cooling fan 16 is stopped (step S117: Y), the control unit 15 may cause the process to proceed to step S104, to compare the battery temperature Tb and the intake air temperature Tc. If the control unit 15 determines that driving of the cooling fan 16 is not stopped (step S117: N), the control unit 15 may cause the process to return to step S115.

Figure 8:
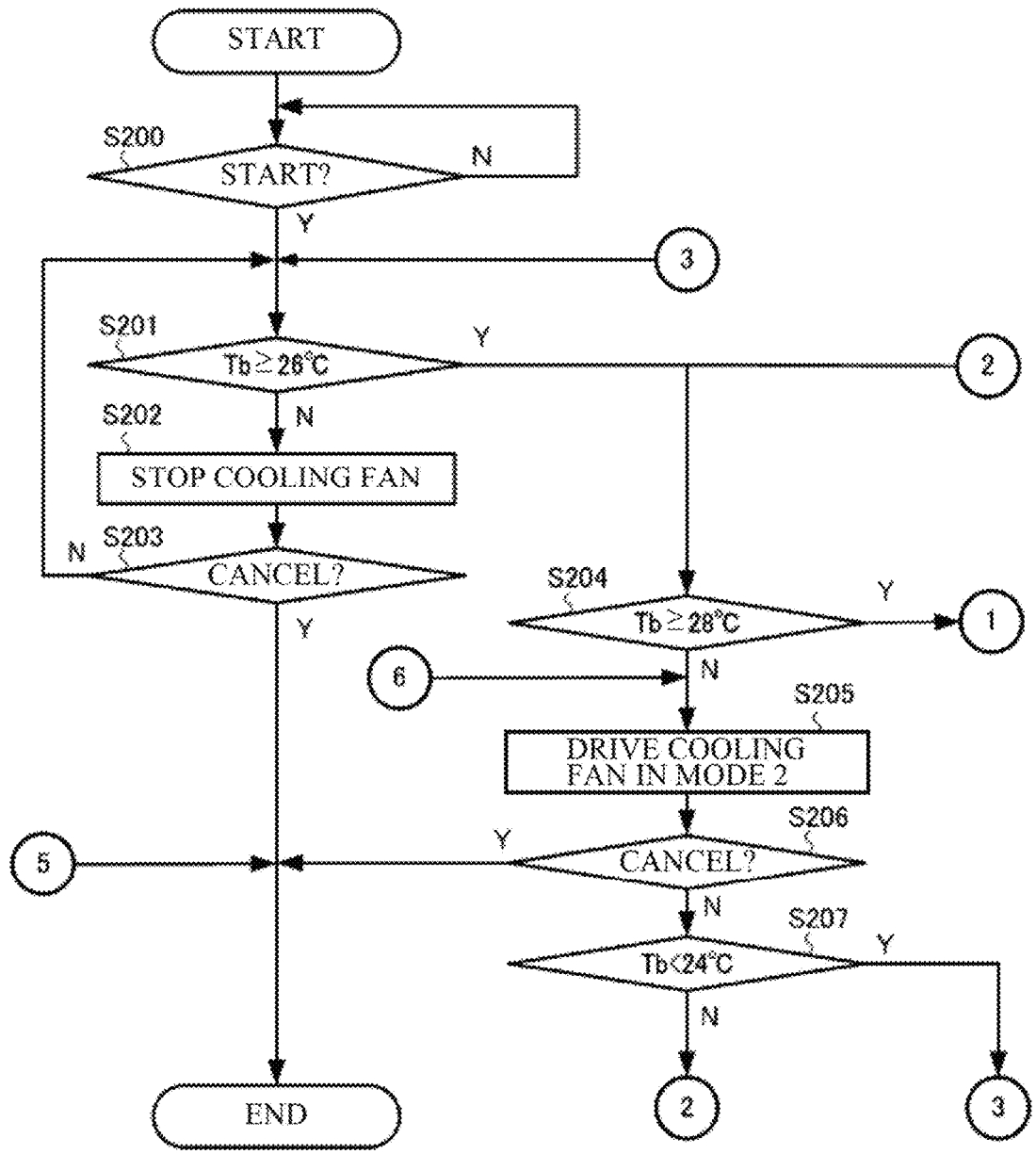
FIG. 8 is a flowchart illustrating operation of a cooling fan drive control process in a window open state to be executed in the cooling fan control system according to one example embodiment of the disclosure.
Figure 9:
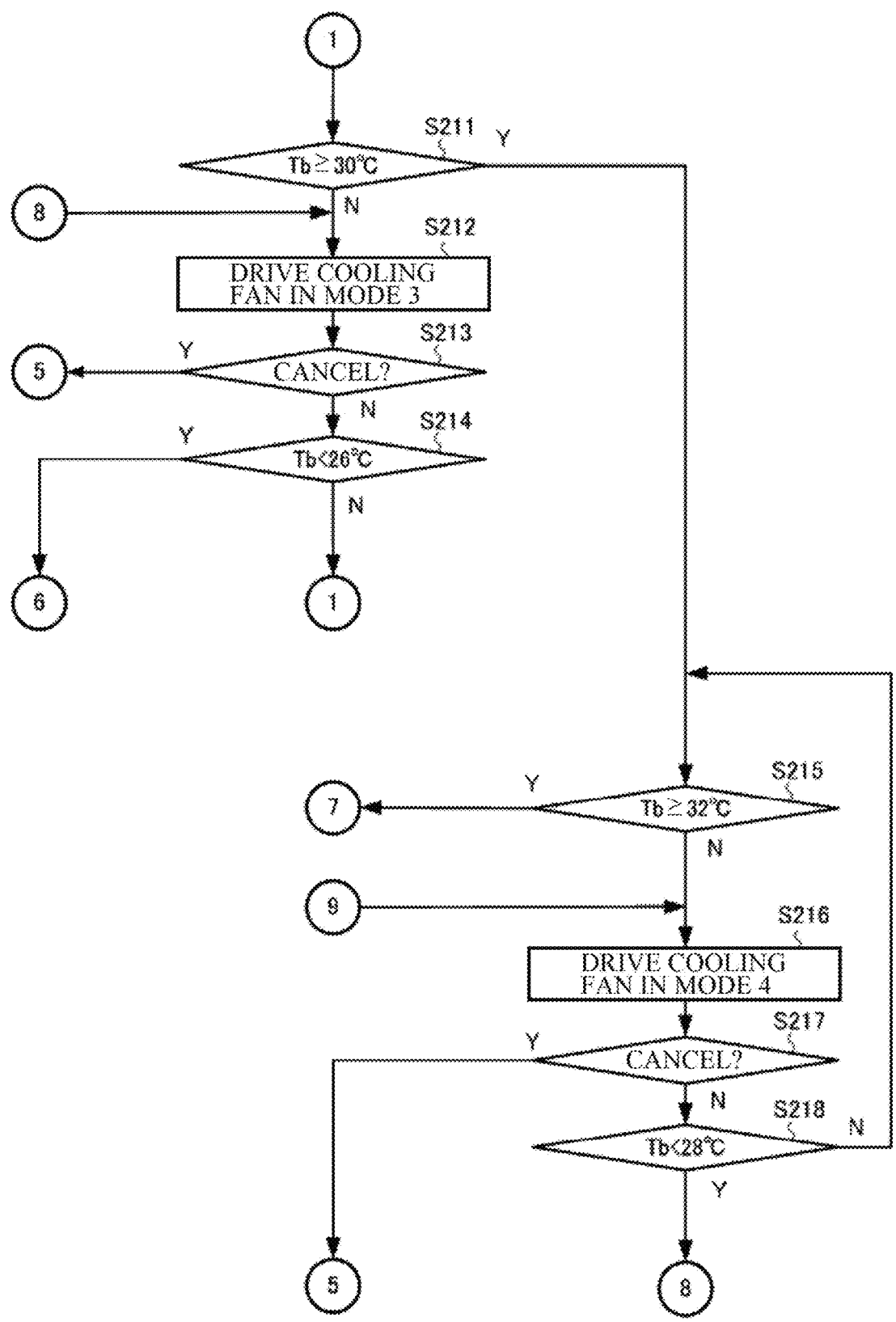
FIG. 9 is a flowchart illustrating the operation of the cooling fan drive control process in the window open state to be executed in the cooling fan control system according to one example embodiment of the disclosure.
Figure 10:
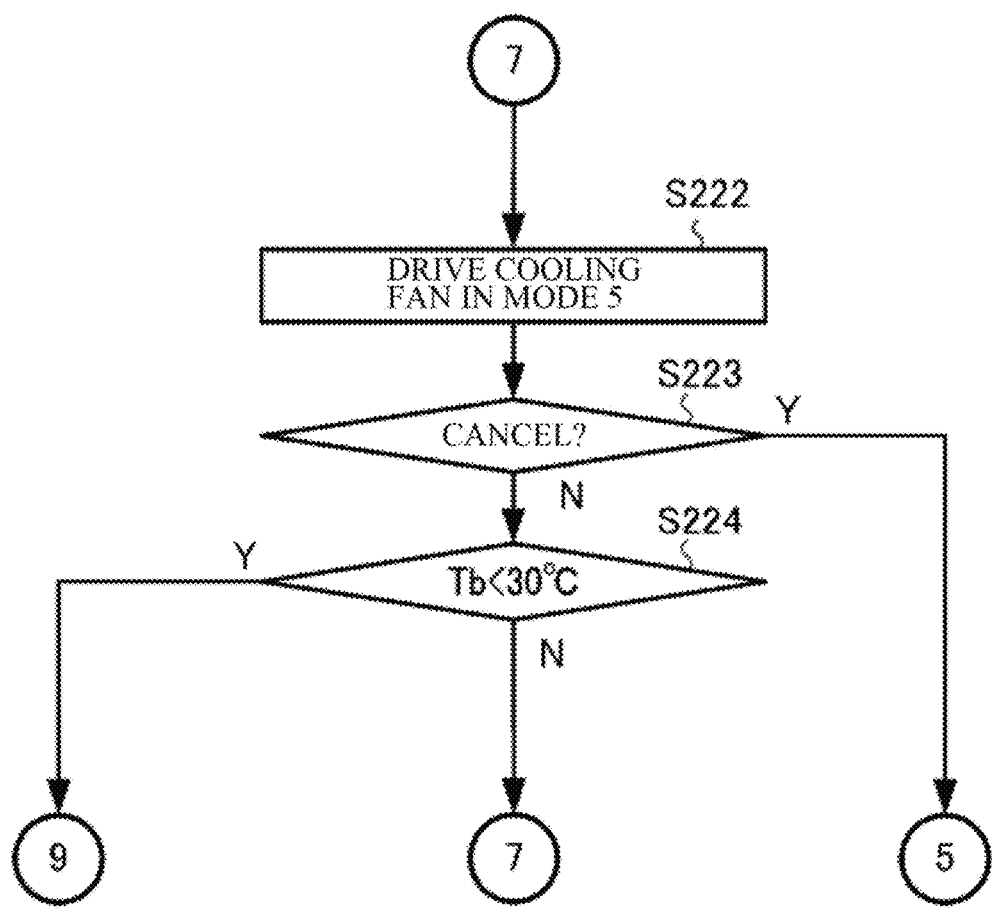
FIG. 10 is a flowchart illustrating the operation of the cooling fan drive control process in the window open state to be executed in the cooling fan control system according to one example embodiment of the disclosure.

Next, description is given of operation of the cooling fan drive control process in the window open state in the cooling fan control system 10 according to the example embodiment, with reference to FIGS. 8 to 10.

FIGS. 8 to 10 are flowcharts illustrating the operation of the cooling fan drive control process in the window open state in the cooling fan control system 10 according to the example embodiment.

The operation may be started by step S112 of the cooling fan startup control process. The operation may be a process that operates in parallel with the cooling fan startup control process after being started.

First, the control unit 15 may determine whether a timing of starting the cooling fan drive control process in the window open state has arrived (step S200). If the control unit 15 determines that the timing of starting the cooling fan drive control process in the window open state has not arrived (step S200: N), the control unit 15 may repeat step S200. If the control unit 15 determines that the timing of starting the cooling fan drive control process in the window open state has arrived (step S200: Y), the control unit 15 may thereafter determine whether the battery temperature Tb is greater than or equal to the temperature threshold of "26" ° C. (step S201).

At this time, if the control unit 15 determines that the battery temperature Tb is not greater than or equal to the temperature threshold of "26" ° C. (step S201: N), the control unit 15 may cause the process to proceed to step S202. If the control unit 15 determines that the battery temperature Tb is greater than or equal to the temperature threshold of "26" ° C. (step S201: Y), the control unit 15 may cause the process to proceed to step S204.

Thereafter, upon determining that the battery temperature Tb is not greater than or equal to the temperature threshold of "26" ° C., the control unit 15 may set the mode 0, and stop driving of the cooling fan 16 or keep driving of the cooling fan 16 stopped (step S202).

Thereafter, the control unit 15 may determine whether a cancellation condition for the operation, such as stop of the electric motor or the engine or detection of the window closed state of the window 100, is satisfied (step S203).

At this time, if the control unit 15 determines that the cancellation condition is satisfied (step S203: Y), the control unit 15 may cancel the operation. If the control unit 15 determines that the cancellation condition is not satisfied (step S203: N), the control unit 15 cause the process to return to step S201.

If the control unit 15 determines that the battery temperature Tb is greater than or equal to the temperature threshold of "26" ° C., or if the process returns from step S207, the control unit 15 may determine whether the battery temperature Tb is greater than or equal to the temperature threshold of "28" ° C. (step S204).

At this time, if the control unit 15 determines that the battery temperature Tb is not greater than or equal to the temperature threshold of "28" ° C. (step S204: N), or if the process returns from step S214, the control unit 15 may control driving of the cooling fan 16 in the mode 2 (step S205).

Thereafter, the control unit 15 may determine whether a cancellation condition for the operation, such as stop of the electric motor or the engine or detection of the closed state of the window 100, is satisfied (step S206).

At this time, if the control unit 15 determines that the cancellation condition is satisfied (step S206: Y), the control unit 15 may cancel the operation. If the control unit 15 determines that the cancellation condition is not satisfied (step S206: N), the control unit 15 cause the process to proceed to step S207.

Thereafter, the control unit 15 may determine whether the battery temperature Tb has become less than the temperature threshold of "24" ° C. (step S207).

At this time, if the control unit 15 determines that the battery temperature Tb has not become less than the temperature threshold of "24" ° C. (step S207: N), the control unit 15 may cause the process to return to step S204. If the control unit 15 determines that the battery temperature Tb has become less than the temperature threshold of "24" ° C. (step S207: Y), the control unit 15 may cause the process to return to step S201.

Thereafter, the control unit 15 may determine whether the battery temperature Tb is greater than or equal to the temperature threshold of "30" ° C. (step S211).

At this time, if the control unit 15 determines that the battery temperature Tb is not greater than or equal to the temperature threshold of "30" ° C. (step S211: N), or if the process returns from step S218, the control unit 15 may control driving of the cooling fan 16 in the mode 3 (step S212).

Thereafter, the control unit 15 may determine whether a cancellation condition for the operation, such as stop of the electric motor or the engine or detection of the closed state of the window 100, is satisfied (step S213).

At this time, if the control unit 15 determines that the cancellation condition is satisfied (step S213: Y), the control unit 15 may cancel the operation. If the control unit 15 determines that the cancellation condition is not satisfied (step S213: N), the control unit 15 cause the process to proceed to step S214.

Thereafter, the control unit 15 may determine whether the battery temperature Tb has become less than the temperature threshold of "26" ° C. (step S214).

At this time, if the control unit 15 determines that the battery temperature Tb has become less than the temperature threshold of "26" ° C. (step S214: N), the control unit 15 may cause the process to return to step S205. If the control unit 15 determines that the battery temperature Tb has not become less than the temperature threshold of "26" ° C. (step S214: Y), the control unit 15 may cause the process to return to step S211.

Thereafter, the control unit 15 may determine whether the battery temperature Tb is greater than or equal to the temperature threshold of "32" ° C. (step S215).

At this time, if the control unit 15 determines that the battery temperature Tb is not greater than or equal to the temperature threshold of "32" ° C. (step S215: N), or if the process returns from step S224, the control unit 15 may control driving of the cooling fan 16 in the mode 4 (step S216).

Thereafter, the control unit 15 may determine whether a cancellation condition for the operation, such as stop of the electric motor or the engine or detection of the closed state of the window 100, is satisfied (step S217).

At this time, if the control unit 15 determines that the cancellation condition is satisfied (step S217: Y), the control unit 15 may cancel the operation. If the control unit 15 determines that the cancellation condition is not satisfied (step S217: N), the control unit 15 cause the process to proceed to step S218.

Thereafter, the control unit 15 may determine whether the battery temperature Tb has become less than the temperature threshold of "28" ° C. (step S218).

At this time, if the control unit 15 determines that the battery temperature Tb has not become less than the temperature threshold of "28" ° C. (step S218: N), the control unit 15 may cause the process to return to step S215. If the control unit 15 determines that the battery temperature Tb has become less than the temperature threshold of "28" ° C. (step S218: Y), the control unit 15 may cause the process to return to step S212.

Thereafter, if the control unit 15 determines in step S215 that the battery temperature Tb is greater than or equal to the temperature threshold of "32" ° C. (step S215: Y), or if the process returns from step S224, the control unit 15 may control driving of the cooling fan 16 in the mode 5 (step S222).

Thereafter, the control unit 15 may determine whether a cancellation condition for the operation, such as stop of the electric motor or the engine or detection of the closed state of the window 100, is satisfied (step S223).

At this time, if the control unit 15 determines that the cancellation condition is satisfied (step S223: Y), the control unit 15 may end the operation. If the control unit 15 determines that the cancellation condition is not satisfied (step S223: N), the control unit 15 cause the process to proceed to step S224.

Thereafter, the control unit 15 may determine whether the battery temperature Tb has become less than the temperature threshold of "30" ° C. (step S224).

At this time, if the control unit 15 determines that the battery temperature Tb has not become less than the temperature threshold of "30" ° C. (step S224: N), the control unit 15 may cause the process to return to step S222. If the control unit 15 determines that the battery temperature Tb has become less than the temperature threshold of "30" ° C. (step S224: Y), the control unit 15 may cause the process to return to step S216.

Figure 11:
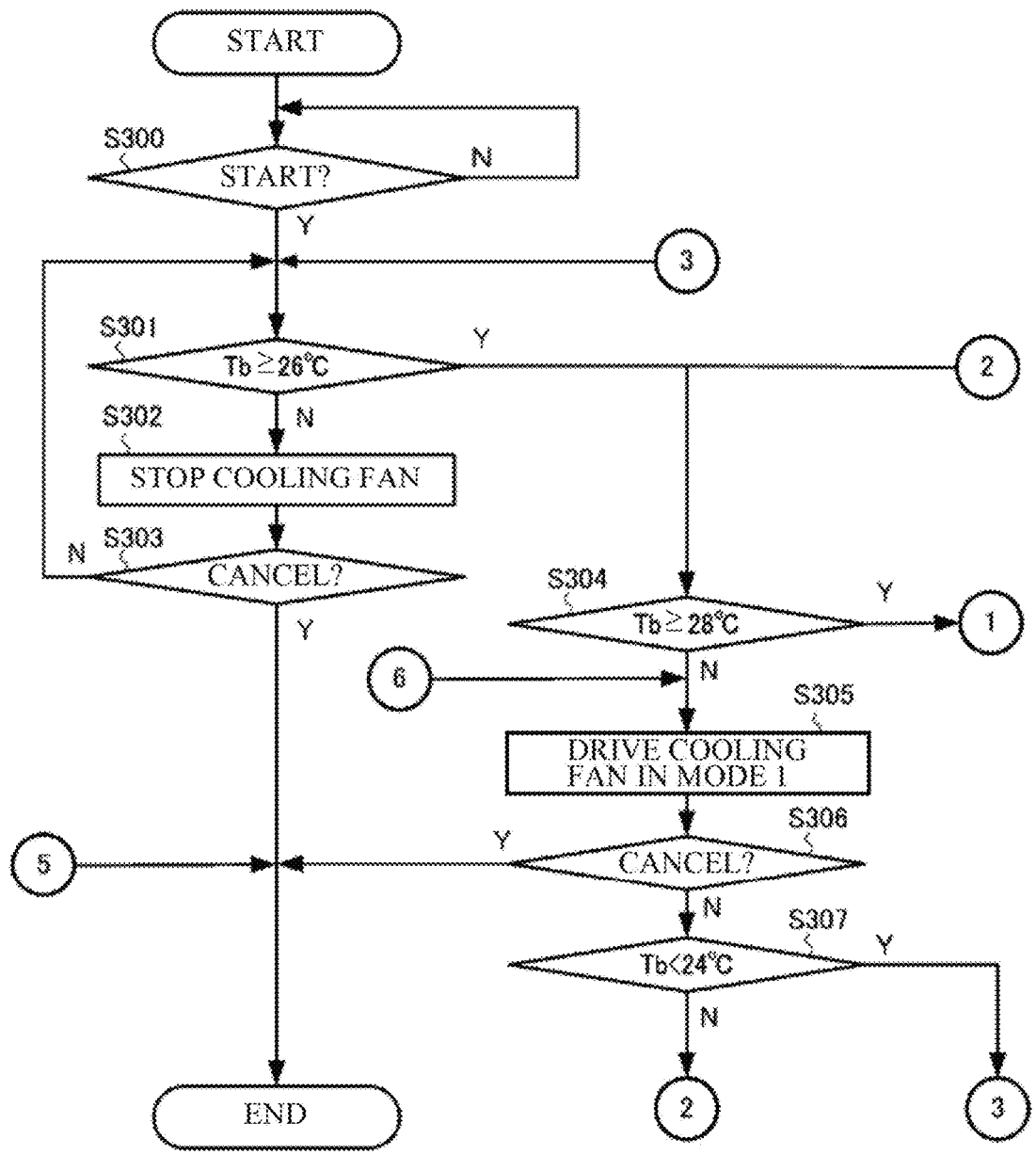
FIG. 11 is a flowchart illustrating operation of the cooling fan drive control process in a window closed state to be executed in the cooling fan control system according to one example embodiment of the disclosure.
Figure 12:
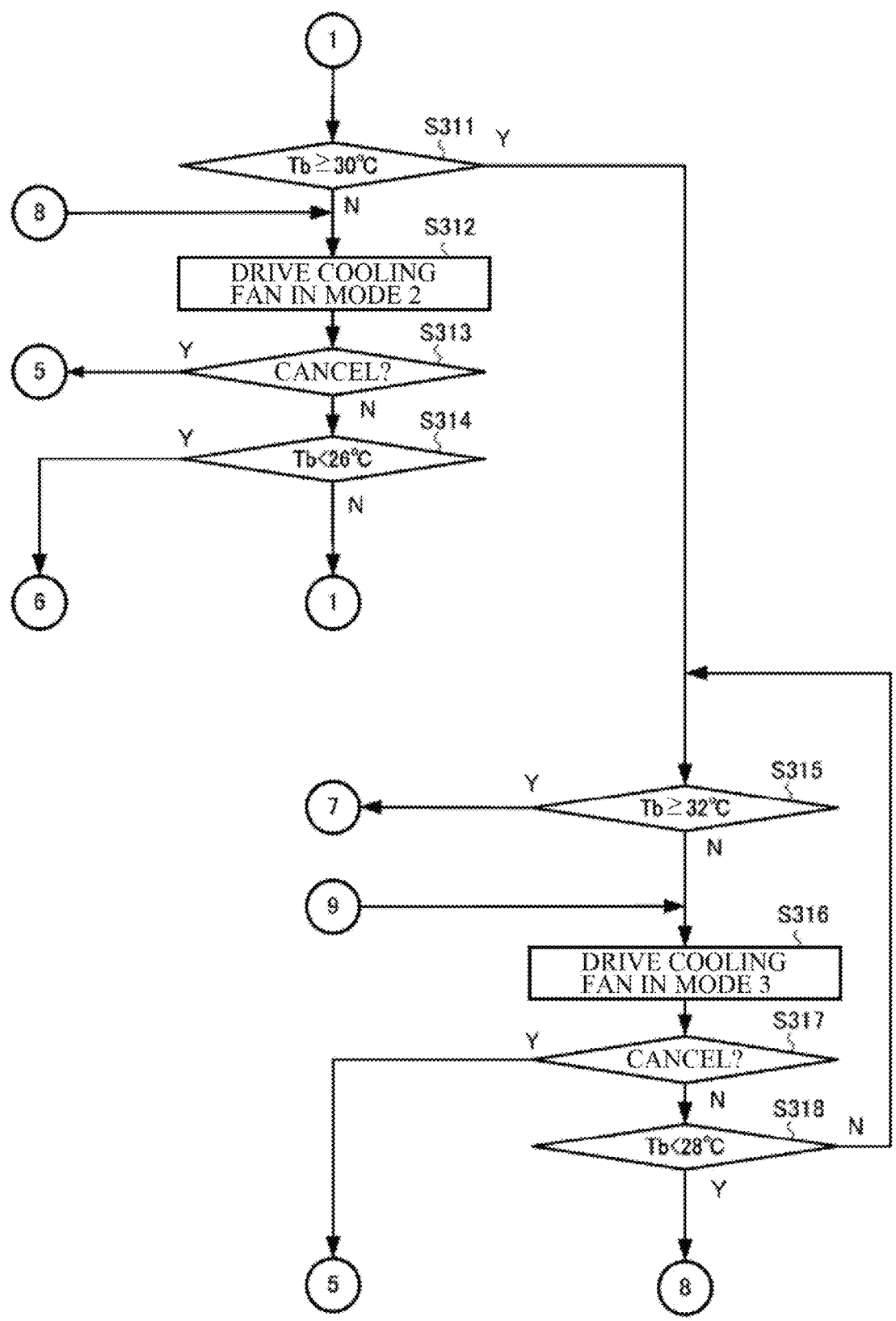
FIG. 12 is a flowchart illustrating the operation of the cooling fan drive control process in the window closed state to be executed in the cooling fan control system according to one example embodiment of the disclosure.
Figure 13:
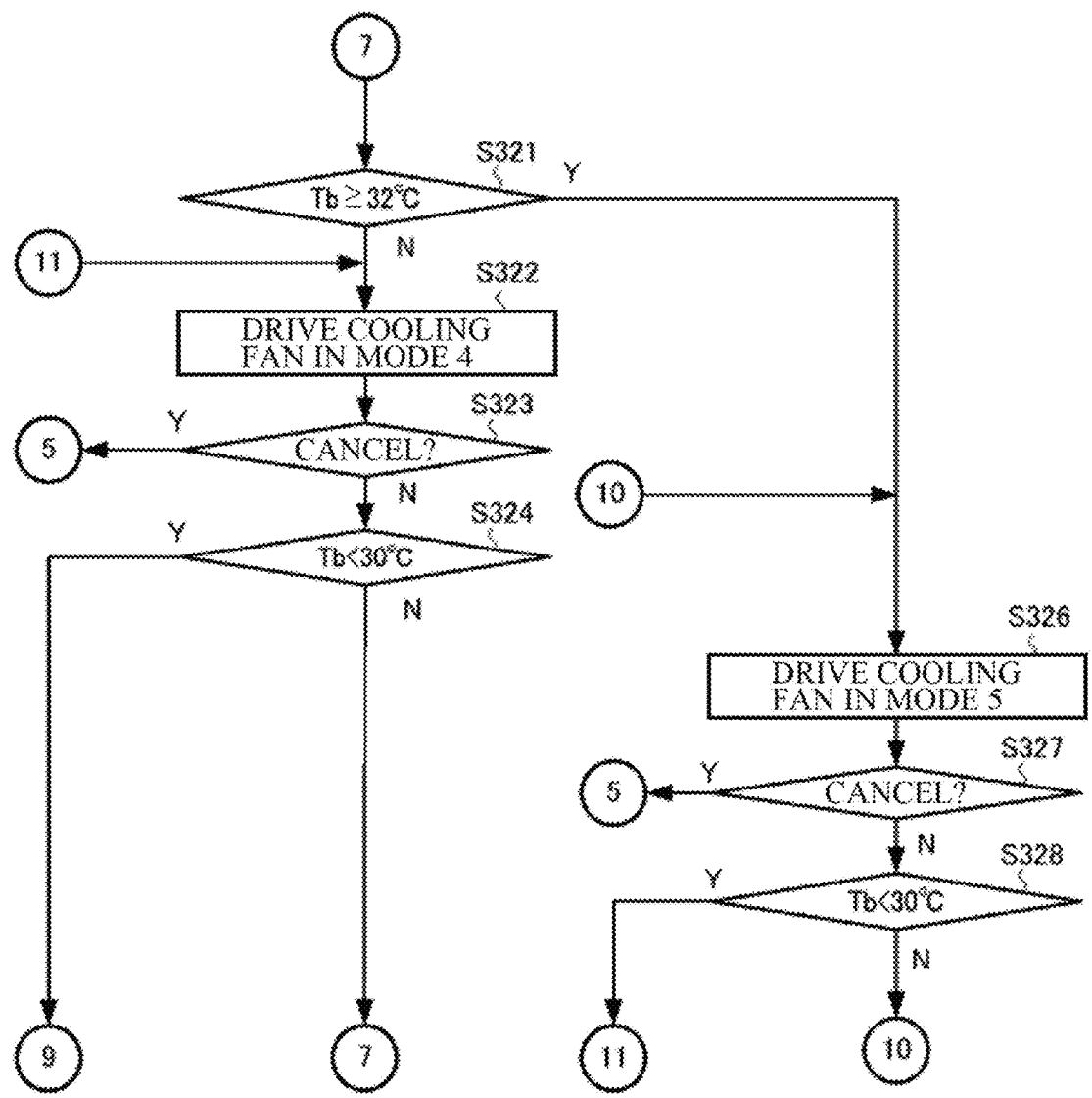
FIG. 13 is a flowchart illustrating the operation of the cooling fan drive control process in the window closed state to be executed in the cooling fan control system according to one example embodiment of the disclosure.

Next, description is given of operation of the cooling fan drive control process in the window closed state in the cooling fan control system 10 according to the example embodiment, with reference to FIGS. 11 to 13.

FIGS. 11 to 13 are flowcharts illustrating the operation of the cooling fan drive control process in the window closed state in the cooling fan control system 10 according to the example embodiment.

The operation may be started by step S114 of the cooling fan startup control process. The operation may be a process that operates in parallel with the cooling fan startup control process after being started.

First, the control unit 15 may determine whether a timing of starting the cooling fan drive control process in the window closed state has arrived (step S300). If the control unit 15 determines that the timing of starting the cooling fan drive control process in the window closed state has not arrived (step S300: N), the control unit 15 may repeat step S300. If the control unit 15 determines that the timing of starting the cooling fan drive control process in the window closed state has arrived (step S300: Y), the control unit 15 may thereafter determine whether the battery temperature Tb is greater than or equal to the temperature threshold of "26" ° C. (step S301).

At this time, if the control unit 15 determines that the battery temperature Tb is not greater than or equal to the temperature threshold of "26" ° C. (step S301: N), the control unit 15 may cause the process to proceed to step S302. If the control unit 15 determines that the battery temperature Tb is greater than or equal to the temperature threshold of "26" ° C. (step S301: Y), the control unit 15 may cause the process to proceed to step S304.

Thereafter, upon determining that the battery temperature Tb is not greater than or equal to the temperature threshold of "26" ° C., the control unit 15 may set the mode 0, and stop driving of the cooling fan 16 or keep driving of the cooling fan 16 stopped (step S302).

Thereafter, the control unit 15 may determine whether a cancellation condition for the operation, such as stop of the electric motor or the engine or detection of the window open state of the window 100, is satisfied (step S303).

At this time, if the control unit 15 determines that the cancellation condition is satisfied (step S303: Y), the control unit 15 may cancel the operation. If the control unit 15 determines that the cancellation condition is not satisfied (step S303: N), the control unit 15 cause the process to return to step S301.

If the control unit 15 determines that the battery temperature Tb is greater than or equal to the temperature threshold of "26" ° C., or if the process returns from step S307, the control unit 15 may determine whether the battery temperature Tb is greater than or equal to the temperature threshold of "28" ° C. (step S304).

At this time, if the control unit 15 determines that the battery temperature Tb is not greater than or equal to the temperature threshold of "28" ° C. (step S304: N), or if the process returns from step S314, the control unit 15 may control driving of the cooling fan 16 in the mode 1 (step S305).

Thereafter, the control unit 15 may determine whether a cancellation condition for the operation, such as stop of the electric motor or the engine or detection of the window open state of the window 100, is satisfied (step S306).

At this time, if the control unit 15 determines that the cancellation condition is satisfied (step S306: Y), the control unit 15 may cancel the operation. If the control unit 15 determines that the cancellation condition is not satisfied (step S306: N), the control unit 15 cause the process to proceed to step S307.

Thereafter, the control unit 15 may determine whether the battery temperature Tb has become less than the temperature threshold of "24" ° C. (step S307).

At this time, if the control unit 15 determines that the battery temperature Tb has not become less than the temperature threshold of "24" ° C. (step S307: N), the control unit 15 may cause the process to return to step S304. If the control unit 15 determines that the battery temperature Tb has become less than the temperature threshold of "24" ° C. (step S307: Y), the control unit 15 may cause the process to return to step S301.

Thereafter, the control unit 15 may determine whether the battery temperature Tb is greater than or equal to the temperature threshold of "30" ° C. (step S311).

At this time, if the control unit 15 determines that the battery temperature Tb is not greater than or equal to the temperature threshold of "30" ° C. (step S311: N), or if the process returns from step S318, the control unit 15 may control driving of the cooling fan 16 in the mode 2 (step S312).

Thereafter, the control unit 15 may determine whether a cancellation condition for the operation, such as stop of the electric motor or the engine or detection of the window open state of the window 100, is satisfied (step S313).

At this time, if the control unit 15 determines that the cancellation condition is satisfied (step S313: Y), the control unit 15 may cancel the operation. If the control unit 15 determines that the cancellation condition is not satisfied (step S313: N), the control unit 15 cause the process to proceed to step S314.

Thereafter, the control unit 15 may determine whether the battery temperature Tb has become less than the temperature threshold of "26" ° C. (step S314).

At this time, if the control unit 15 determines that the battery temperature Tb has become less than the temperature threshold of "26" ° C. (step S314: N), the control unit 15 may cause the process to return to step S305. If the control unit 15 determines that the battery temperature Tb has become not less than the temperature threshold of "26" ° C. (step S314: Y), the control unit 15 may cause the process to return to step S311.

Thereafter, the control unit 15 may determine whether the battery temperature Tb is greater than or equal to the temperature threshold of "32" ° C. (step S315).

At this time, if the control unit 15 determines that the battery temperature Tb is not greater than or equal to the temperature threshold of "32" ° C. (step S315: N), or if the process returns from step S324, the control unit 15 may control driving of the cooling fan 16 in the mode 3 (step S316).

Thereafter, the control unit 15 may determine whether a cancellation condition for the operation, such as stop of the electric motor or the engine or detection of the window open state of the window 100, is satisfied (step S317).

At this time, if the control unit 15 determines that the cancellation condition is satisfied (step S317: Y), the control unit 15 may cancel the operation. If the control unit 15 determines that the cancellation condition is not satisfied (step S317: N), the control unit 15 cause the process to proceed to step S318.

Thereafter, the control unit 15 may determine whether the battery temperature Tb has become less than the temperature threshold of "28" ° C. (step S318).

At this time, if the control unit 15 determines that the battery temperature Tb has not become less than the temperature threshold of "28" ° C. (step S318: N), the control unit 15 may cause the process to return to step S315. If the control unit 15 determines that the battery temperature Tb has become less than the temperature threshold of "28" ° C. (step S318: Y), the control unit 15 may cause the process to return to step S312.

Thereafter, the control unit 15 may determine whether the battery temperature Tb is greater than or equal to the temperature threshold of "32" ° C. (step S321).

At this time, if the control unit 15 determines that the battery temperature Tb is not greater than or equal to the temperature threshold of "32" ° C. (step S321: N), or if the process returns from step S328, the control unit 15 may control driving of the cooling fan 16 in the mode 4 (step S322).

Thereafter, the control unit 15 may determine whether a cancellation condition for the operation, such as stop of the electric motor or the engine or detection of the window open state of the window 100, is satisfied (step S323).

At this time, if the control unit 15 determines that the cancellation condition is satisfied (step S323: Y), the control unit 15 may cancel the operation. If the control unit 15 determines that the cancellation condition is not satisfied (step S323: N), the control unit 15 cause the process to proceed to step S324.

Thereafter, the control unit 15 may determine whether the battery temperature Tb has become less than the temperature threshold of "30" ° C. (step S324).

At this time, if the control unit 15 determines that the battery temperature Tb has not become less than the temperature threshold of "30" ° C. (step S324: N), the control unit 15 may cause the process to return to step S321. If the control unit 15 determines that the battery temperature Tb has become less than the temperature threshold of "30" ° C. (step S324: Y), the control unit 15 may cause the process to return to step S316.

In contrast, if the control unit 15 determines that the battery temperature Tb is greater than or equal to the temperature threshold of "32" ° C. (step S321: Y), the control unit 15 may control driving of the cooling fan 16 in the mode 5 (step S326).

Thereafter, the control unit 15 may determine whether a cancellation condition for the operation, such as stop of the electric motor or the engine or detection of the window open state of the window 100, is satisfied (step S327).

At this time, if the control unit 15 determines that the cancellation condition is satisfied (step S327: Y), the control unit 15 may cancel the operation. If the control unit 15 determines that the cancellation condition is not satisfied (step S327: N), the control unit 15 cause the process to proceed to step S328.

Thereafter, the control unit 15 may determine whether the battery temperature Tb has become less than the temperature threshold of "30" ° C. (step S328).

At this time, if the control unit 15 determines that the battery temperature Tb has not become less than the temperature threshold of "30" ° C. (step S328: N), the control unit 15 may cause the process to return to step S326. If the control unit 15 determines that the battery temperature Tb has become less than the temperature threshold of "30" ° C. (step S328: Y), the control unit 15 may cause the process to return to step S322.

Figure 14:
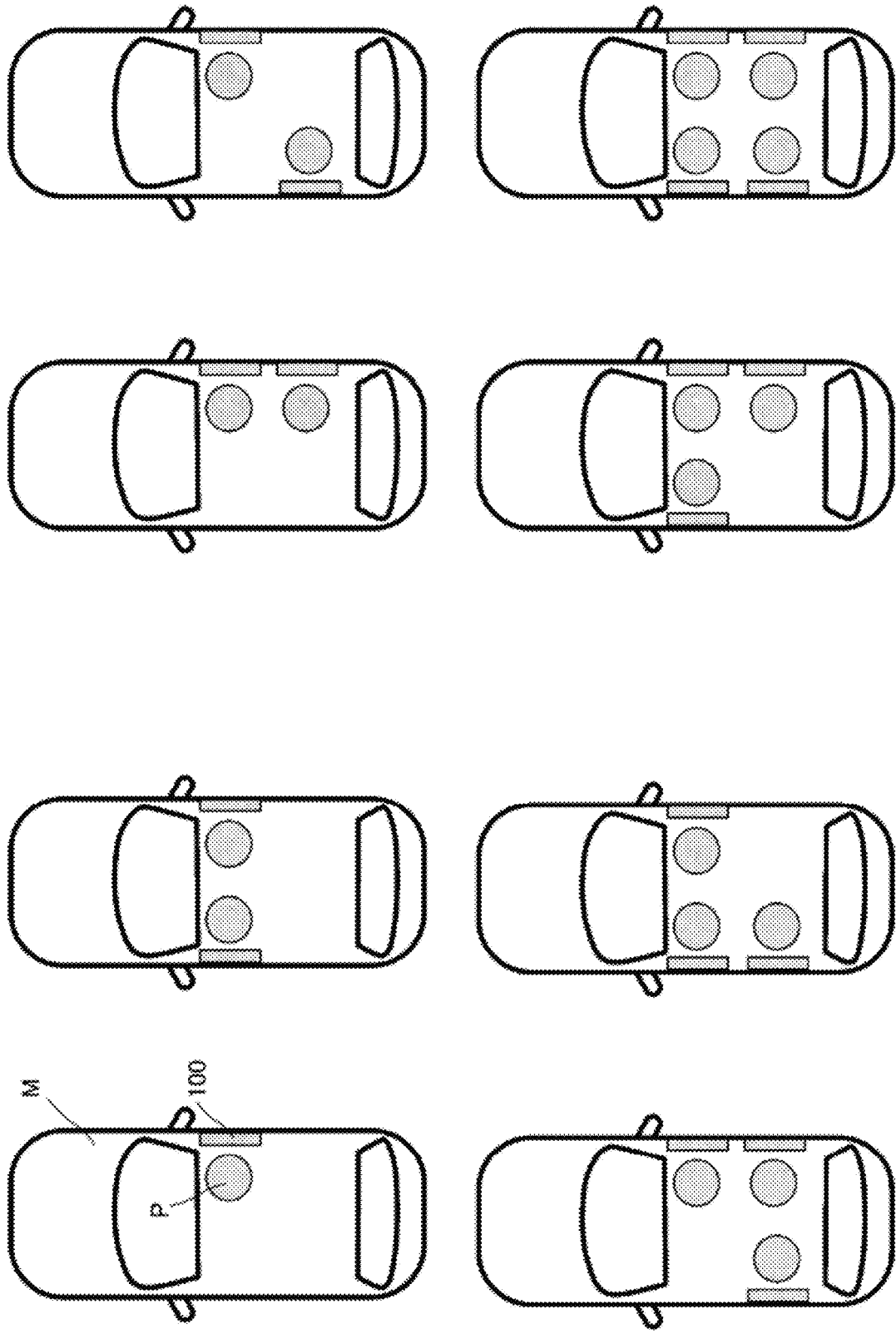
FIG. 14 is a diagram illustrating a condition in using a special temperature threshold (group) according to one modification example of the disclosure.
Figure 15:
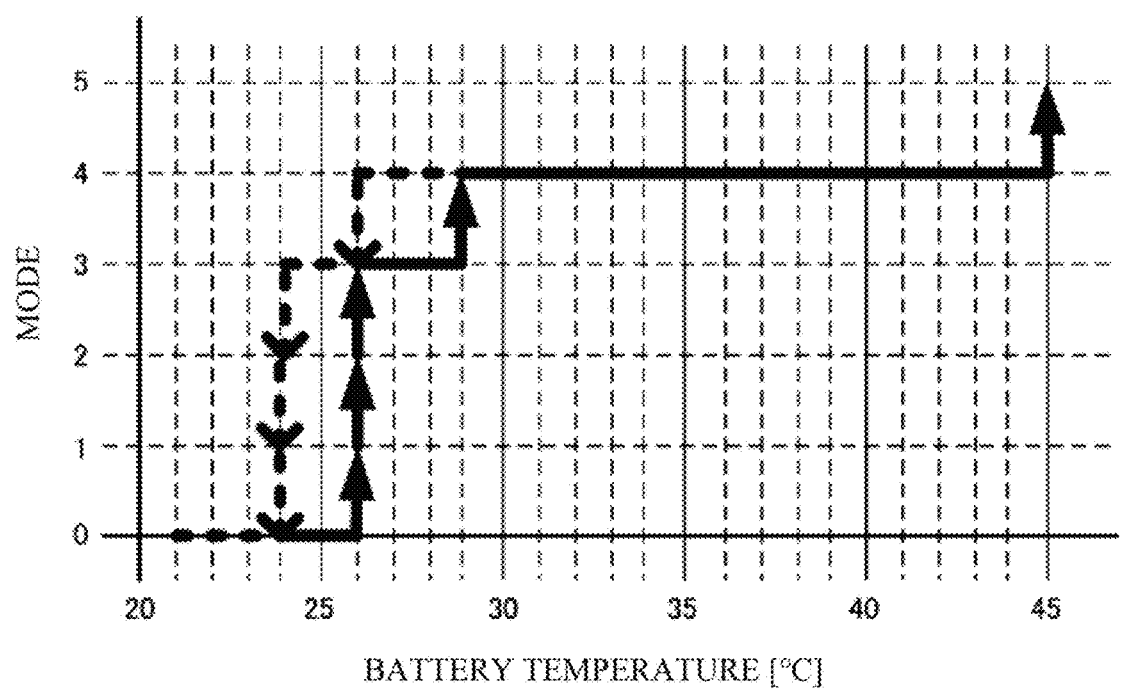
FIG. 15 is a diagram or a map illustrating a relationship between the special temperature threshold (group) during an increase and a decrease in temperature and each mode in which the cooling capacity of the cooling fan corresponding to the battery temperature is defined, when the window is in the open state in one modification example of the disclosure.

Next, as Modification Example 1, description is given of a drive control of the cooling fan 16 based on the seating position and the position of the window 100 in the open state, with reference to FIGS. 14 and 15.

FIG. 14 is a diagram illustrating a condition in using a special temperature threshold (group) according to the modification example. FIG. 14 illustrates examples of an occupant P and the window 100 in the open state adjacent to the occupant P.

FIG. 15 is a diagram or a map illustrating a relationship between the special temperature threshold (group) during an increase and a decrease in temperature, and each mode in which the cooling capacity of the cooling fan 16 corresponding to the battery temperature is defined, when the window 100 is in the open state in the modification example.

In some embodiments, in each mode in driving the cooling fan 16 associated with the battery temperature, different thresholds may be used, based on not only the open or closed state of the window 100, but also a relationship between the seating position of the occupant P and the position of the window 100 that is opened and closed.

In other words, when the seating position of the occupant P is near the window 100 in the open state, the background noise such as road noise feels larger to the occupant P.

Thus, in such a case, even if the output of the cooling fan 16 is further increased and the noise thereof increases, it is possible to reduce an influence of the noise of the cooling fan 16 on the occupant P.

Hence, in the modification example, the cooling fan control system 10 may be configured to use different thresholds, depending on the open or closed state of the window 100 recognized by the window open or closed state recognition process, and depending on the detected seating position of the occupant P and the identified position of the window 100 in the open state.

In one example, the cooling fan control system 10 according to the modification example may be configured to execute a seating position detection process of detecting the seating position of the occupant P on board the vehicle M, and execute an identification process of identifying the position of the window 100 in the open state. The identification process of identifying the position of the window 100 in the open state may hereinafter be referred to as an "open window position identification process".

The cooling fan control system 10 according to the modification example may thus use different thresholds, depending on the open or closed state of the window 100 recognized by the window open or closed state recognition process described above, and depending on the detected seating position of the occupant P and the identified position of the window 100 in the open state.

When the seating position of the occupant P and the position of the window 100 in the open state have a specific relationship, the control unit 15 according to the modification example may use the special temperature threshold (group), in addition to the high-output temperature threshold (group) and the low-output temperature threshold (group) described above.

For example, the control unit 15 may execute the seating position detection process and the open window position identification process, in addition to recognizing the open or closed state of the window 100, to set one of the high-output temperature threshold (group), the low-output temperature threshold (group), and the special temperature threshold (group) or to switch between them.

When the seating position of the occupant P and the position of the window 100 in the open state satisfy a predetermined condition, the control unit 15 may use the special temperature threshold (group), instead of the high-output temperature threshold (group).

In one example, as the seating position detection process, when the control unit 15 receives a signal or data outputted from each seating sensor 40 when the occupant P is seated, the control unit 15 may recognize the position where the occupant P is seated, detected by the corresponding seating sensor 40.

As the open window position identification process, when the control unit 15 receives a signal or data indicating detection of the window 100 in the open state from each window opening and closing drive unit 20, the control unit 15 may identify that the corresponding window 100 is in the open state.

As the predetermined condition, when the control unit 15 identifies that the adjacent window 100 is in the open state at all seating positions of the occupants P, as illustrated in FIG. 14, the control unit 15 may set the special temperature threshold (group) as the execution threshold.

At this time, when executing the cooling fan drive control process based on another temperature threshold (group), the control unit 15 may execute the switching process of switching from the other temperature threshold (group) to the special temperature threshold (group).

As illustrated in FIG. 15, for example, the control unit 15 may use 26° C., 29° C., and 45° C., as the thresholds to be used when the battery temperature increases, in the special temperature threshold (group).

In this case, as the cooling fan drive control process, the control unit 15 may set the mode 0 (stopping driving) for the temperature range of temperatures less than 26° C., and set the mode 3 for the temperature range from 26° C. to 29° C., as illustrated in FIG. 15.

Furthermore, as the cooling fan drive control process, the control unit 15 may set the mode 4 for the temperature range from 29° C. to 45° C., and set the mode 5 for the temperature range of greater than or equal to 45° C., as illustrated in FIG. 15.

In contrast, as illustrated in FIG. 15, for example, the control unit 15 may use 24° C. and 26° C., as the thresholds to be used when the battery temperature decreases, in the special temperature threshold (group).

In this case, as the cooling fan drive control process, the control unit 15 may set the mode 3 when the battery temperature becomes less than 26° C. in the mode 4, and set the mode 0 and stop the cooling fan 16 when the battery temperature becomes less than 24° C., as illustrated in FIG. 15.

The example embodiments of the disclosure are not limited to those described in the foregoing example embodiments, but various modifications may be made. For example, terms cited as broad or synonymous terms in an item of the description or the drawings may be replaced with broad or synonymous terms in other items of the description or the drawings.

The example embodiments of the disclosure may include the substantially same configurations as the configurations described in the foregoing example embodiments. The substantially same configurations may be, for example, configurations having the same operation, method, and results, or configurations having the same purpose and effects. The example embodiments of the disclosure may include configurations in which non-essential portions of the configurations described in the foregoing example embodiments are replaced. Furthermore, the example embodiments of the disclosure may include a configuration that produces the same workings and effects as the configurations described in the foregoing example embodiments, or a configuration that makes it possible to achieve the same purpose as those of the forging example embodiments. In addition, the example embodiments of the disclosure may include configurations in which known techniques are added to the configurations described in the foregoing example embodiments.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The control unit 15 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control unit 15. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control unit 15 illustrated in FIG. 1.

The invention claimed is:

1. A battery cooling system to be applied to a vehicle, the battery cooling system comprising:
   one or more processors; and
   one or more memories communicably coupled to the one or more processors, wherein
   the one or more processors are configured to
      execute a temperature acquisition process of acquiring a temperature of a battery mounted on the vehicle,
      execute an output control process of making a comparison of the temperature of the battery acquired by the temperature acquisition process with a predetermined threshold, and controlling, in accordance with a result of the comparison, a cooling capacity of a cooling fan configured to cool the battery,
      execute an open or closed state recognition process of recognizing an open or closed state of a window openable and closable and provided in the vehicle, and,
      in executing the output control process, use different thresholds as the predetermined threshold to change the cooling capacity of the cooling fan, in response to the open or closed state of the window being recognized by the open or closed state recognition process.

2. The battery cooling system according to claim 1, wherein, in executing the output control process, the one or more processors are configured to, when the one or more processors recognize that the window is in the open state by the open or closed state recognition process, use a second threshold that makes the cooling capacity of the cooling fan higher, at the same temperature of the battery, than a first threshold to be used when the window is in the closed state.

3. The battery cooling system according to claim 1, wherein the one or more processors are configured to
   execute a seating position detection process of detecting a seating position of an occupant on board the vehicle,
   execute an identification process of identifying a position of the window in the open state, and,
   in executing the output control process, use different thresholds as the predetermined threshold, depending on the open or closed state of the window recognized by the open or closed state recognition process, and depending on the detected seating position of the occupant and the identified position of the window in the open state.

4. A vehicle comprising a battery cooling system configured to cool a battery of the vehicle, the battery cooling system comprising:
   one or more processors;
   one or more memories communicably coupled to the one or more processors;
   a temperature sensor; and
   an open or closed state sensor, wherein
   the one or more processors are configured to
      execute a temperature acquisition process of causing the temperature sensor to detect a temperature of the battery, and acquiring the detected temperature of the battery,
      execute an output control process of making a comparison of the temperature of the battery acquired by the temperature acquisition process with a predetermined threshold, and controlling, in accordance with a result of the comparison, a cooling capacity of a cooling fan configured to cool the battery,
      execute an open or closed state recognition process of causing the open or closed state sensor to recognize an open or closed state of a window openable and closable and provided in the vehicle, and,
      in executing the output control process, use different thresholds as the predetermined threshold to change the cooling capacity of the cooling fan, in response to the open or closed state of the window being recognized by the open or closed state recognition process.

5. A non-transitory computer readable recording medium containing a computer program, the computer program causing, when executed by a computer, the computer to implement a method, the method comprising:
   acquiring a temperature of a battery mounted on a vehicle;
   executing an output control of making a comparison of the acquired temperature of the battery with a predetermined threshold, and controlling, in accordance with a result of the comparison, a cooling capacity of a cooling fan configured to cool the battery;
   recognizing an open or closed state of a window openable and closable and provided in the vehicle; and
   changing the predetermined threshold to change the cooling capacity of the cooling fan, in response to the open or closed state of the window being recognized, in executing the output control.

6. The battery cooling system according to claim 1, wherein control the cooling capacity of the cooling fan comprise control the number of rotations or a duty ratio of the cooling fan.

7. The battery cooling system according to claim 1, wherein, in executing the output control process, the one or more processors are further configured to, when the one or more processors recognize that the window is in the open state by the open or closed state recognition process, enhance the cooling capacity of the cooling fan in accordance with a level of background noise.

8. The vehicle according to claim 4, wherein control the cooling capacity of the cooling fan comprise control the number of rotations or a duty ratio of the cooling fan.

9. The vehicle according to claim 4, wherein, in executing the output control process, the one or more processors are further configured to, when the one or more processors recognize that the window is in the open state by the open or closed state recognition process, enhance the cooling capacity of the cooling fan in accordance with a level of background noise.

10. The non-transitory computer readable recording medium according to claim 5, wherein control the cooling capacity of the cooling fan comprise control the number of rotations or a duty ratio of the cooling fan.

11. The non-transitory computer readable recording medium according to claim 5, wherein, in executing the output control process, the one or more processors are further configured to, when the one or more processors recognize that the window is in the open state by the open or closed state recognition process, enhance the cooling capacity of the cooling fan in accordance with a level of background noise.

* * * * *